(12) United States Patent
Huang et al.

(10) Patent No.: US 12,212,419 B2
(45) Date of Patent: Jan. 28, 2025

(54) SWITCHING BETWEEN HARQ FEEDBACK GRANULARITIES

(71) Applicant: QUALCOMM Incorporated, San Diego, CA (US)

(72) Inventors: Yi Huang, San Diego, CA (US); Peter Gaal, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 17/378,584

(22) Filed: Jul. 16, 2021

(65) Prior Publication Data

US 2022/0021488 A1 Jan. 20, 2022

Related U.S. Application Data

(60) Provisional application No. 63/053,947, filed on Jul. 20, 2020.

(51) Int. Cl.
| | |
|---|---|
| *H04L 1/1812* | (2023.01) |
| *H04L 1/1867* | (2023.01) |
| *H04W 72/02* | (2009.01) |
| *H04W 72/0446* | (2023.01) |
| *H04W 72/23* | (2023.01) |

(52) U.S. Cl.
CPC .......... *H04L 1/1819* (2013.01); *H04L 1/1896* (2013.01); *H04W 72/02* (2013.01); *H04W 72/0446* (2013.01); *H04W 72/23* (2023.01)

(58) Field of Classification Search
CPC ... H04L 1/1819; H04L 1/1896; H04L 5/0092; H04L 1/1854; H04L 5/0055; H04L 1/1864; H04W 72/02; H04W 72/0446; H04W 72/23
USPC ........................................... 370/329
See application file for complete search history.

(56) References Cited

U.S. PATENT DOCUMENTS

| | | | |
|---|---|---|---|
| 2007/0047452 A1* | 3/2007 | Lohr | H04W 28/10 370/242 |
| 2014/0078942 A1* | 3/2014 | Noh | H04L 1/1671 370/280 |
| 2014/0086113 A1* | 3/2014 | Ji | H04W 72/20 370/280 |
| 2014/0269338 A1* | 9/2014 | Jung | H04L 5/0055 370/329 |
| 2015/0271006 A1* | 9/2015 | Han | H04L 1/0016 370/329 |
| 2018/0048498 A1* | 2/2018 | Stern-Berkowitz | H04L 5/0091 |
| 2019/0173623 A1* | 6/2019 | Khosravirad | H04L 1/0079 |

(Continued)

*Primary Examiner* — Thuong Nguyen
(74) *Attorney, Agent, or Firm* — QUALCOMM Incorporated

(57) ABSTRACT

Aspects relate to a base station configuring a user equipment (UE) with multiple (e.g., at least two) hybrid automatic repeat request (HARQ) feedback granularities. In some examples, a first HARQ feedback granularity may be for transmitting HARQ feedback in a first quantity of symbols and a second HARQ feedback granularity may be for transmitting HARQ feedback in a second quantity of symbols. The base station may send an indication to the UE that specifies which HARQ feedback granularity the UE is to use for sending HARQ feedback.

28 Claims, 16 Drawing Sheets

(56) References Cited

U.S. PATENT DOCUMENTS

| | | | | |
|---|---|---|---|---|
| 2019/0342040 | A1* | 11/2019 | Tiirola | H04L 5/0055 |
| 2020/0106554 | A1* | 4/2020 | Chendamarai Kannan | H04L 1/187 |
| 2020/0221449 | A1* | 7/2020 | Bang | H04W 72/21 |
| 2020/0228246 | A1* | 7/2020 | Chendamarai Kannan | H04L 5/0053 |
| 2020/0235866 | A1* | 7/2020 | Liu | H04L 5/0055 |
| 2020/0295882 | A1* | 9/2020 | Wang | H04L 5/0055 |
| 2020/0328848 | A1* | 10/2020 | He | H04L 1/1854 |
| 2021/0298070 | A1* | 9/2021 | Zhang | H04W 74/04 |
| 2021/0392664 | A1* | 12/2021 | Alabbasi | H04W 72/1268 |
| 2021/0400652 | A1* | 12/2021 | Yoshioka | H04L 1/1854 |
| 2022/0109531 | A1* | 4/2022 | Yin | H04L 1/1861 |
| 2022/0116970 | A1* | 4/2022 | Gao | H04L 27/26025 |
| 2022/0150827 | A1* | 5/2022 | Kim | H04L 5/0064 |
| 2022/0167369 | A1* | 5/2022 | Bin Sediq | H04L 1/1864 |
| 2022/0224453 | A1* | 7/2022 | Li | H04L 1/1861 |
| 2022/0286235 | A1* | 9/2022 | Ranta-Aho | H04L 1/1887 |
| 2022/0330298 | A1* | 10/2022 | Cheng | H04W 72/23 |
| 2023/0239080 | A1* | 7/2023 | Marinier | H04L 1/08 714/748 |

* cited by examiner

SWITCHING BETWEEN HARQ FEEDBACK GRANULARITIES

CROSS-REFERENCE TO RELATED APPLICATIONS

The present application for patent claims priority to and the benefit of U.S. Provisional Application No. 63/053,947, titled "SWITCHING BETWEEN HARQ FEEDBACK GRANULARITIES" filed Jul. 20, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to switching between a first hybrid automatic repeat request (HARQ) feedback granularity and a second HARQ feedback granularity.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

Network operators continue to develop mechanisms to maximize throughput and minimize the delay in wireless communication networks. One such mechanism is the Hybrid Automatic Repeat Request (HARQ) process, which may combine both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender.

In general, HARQ uses a stop and wait (SAW) protocol, in which a transmitting entity waits to receive an acknowledged (ACK) or not acknowledged (NACK) indication back from the receiving entity before transmitting another packet or retransmitting the same packet. To fully utilize the bandwidth and increase throughput, multiple parallel HARQ processes may be initiated offset in time from one another. Each HARQ process is identified by a unique HARQ process identifier (ID).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method of wireless communication at a user equipment is disclosed. The method may include receiving a hybrid automatic repeat request (HARQ) configuration specifying a first HARQ feedback granularity and a second HARQ feedback granularity, receiving a first indication specifying that the user equipment is to use the first HARQ feedback granularity, receiving a first downlink transmission after receiving the first indication, and transmitting a first HARQ feedback using the first HARQ feedback granularity. In some aspects, the first HARQ feedback may indicate whether the user equipment successfully received the first downlink transmission.

In some examples, a user equipment may include a transceiver, a memory, and a processor communicatively coupled to the transceiver and the memory. The processor and the memory may be configured to receive via the transceiver a hybrid automatic repeat request (HARQ) configuration specifying a first HARQ feedback granularity and a second HARQ feedback granularity, receive via the transceiver a first indication specifying that the user equipment is to use the first HARQ feedback granularity, receive via the transceiver a first downlink transmission via the transceiver after receiving the first indication, and transmit via the transceiver a first HARQ feedback using the first HARQ feedback granularity. In some aspects, the first HARQ feedback may indicate whether the user equipment successfully received the first downlink transmission.

In some examples, a user equipment may include means for receiving a hybrid automatic repeat request (HARQ) configuration specifying a first HARQ feedback granularity and a second HARQ feedback granularity, means for receiving a first indication specifying that the user equipment is to use the first HARQ feedback granularity, means for receiving a first downlink transmission after receiving the first indication, and means for transmitting a first HARQ feedback using the first HARQ feedback granularity. In some aspects, the first HARQ feedback may indicate whether the user equipment successfully received the first downlink transmission.

In some examples, an article of manufacture for use by a user equipment includes a non-transitory computer-readable medium having stored therein instructions executable by one or more processors of the user equipment to receive a hybrid automatic repeat request (HARQ) configuration specifying a first HARQ feedback granularity and a second HARQ feedback granularity, receive a first indication specifying that the user equipment is to use the first HARQ feedback granularity, receive a first downlink transmission after receiving the first indication, and transmit a first HARQ feedback using the first HARQ feedback granularity. In some aspects, the first HARQ feedback may indicate whether the user equipment successfully received the first downlink transmission.

One or more of the following features may be applicable to any of the method, the apparatuses, and the computer-readable medium of the preceding paragraphs. The first HARQ feedback granularity may be a first sub-slot granularity and the second HARQ feedback granularity may be a second sub-slot granularity. An additional feature may include receiving a resource configuration specifying a plurality of first uplink resources for the first HARQ feedback granularity and a plurality of second uplink resources for the second HARQ feedback granularity. In this case, transmitting the first HARQ feedback may include transmitting the first HARQ feedback on a selected resource of the plurality of first uplink resources. An additional feature may include receiving a second indication specifying that the user equipment is to use the second HARQ feedback granularity, receiving a second downlink transmission after receiving the second indication, generating a second HARQ feedback indicating whether the user equipment successfully received the second downlink transmission, and transmitting the second HARQ feedback using the second HARQ feedback granularity according to the second indication. Receiving the first indication may include receiving a medium access control-control element (MAC-CE) that includes the first indication. Receiving the first indication may include receiving a first downlink control information (DCI) that includes the first indication. Receiving the first indication may include receiving a downlink control information (DCI) that includes the first indication and schedules the first downlink transmission.

In some examples, a method of wireless communication at a base station may include transmitting a hybrid automatic repeat request (HARQ) configuration specifying a first HARQ feedback granularity and a second HARQ feedback granularity, transmitting a first indication specifying that a user equipment is to use the first HARQ feedback granularity, transmitting a first downlink transmission after transmitting the first indication, and receiving a first HARQ feedback at the first HARQ feedback granularity. In some examples, the first HARQ feedback may indicate whether the user equipment successfully received the first downlink transmission.

In some examples, a base station may include a transceiver, a memory, and a processor communicatively coupled to the transceiver and the memory. The processor and the memory may be configured to transmit via the transceiver a hybrid automatic repeat request (HARQ) configuration specifying a first HARQ feedback granularity and a second HARQ feedback granularity, transmit via the transceiver a first indication specifying that the user equipment is to use the first HARQ feedback granularity, transmit via the transceiver a first downlink transmission via the transceiver after transmitting the first indication, and receive via the transceiver a first HARQ feedback at the first HARQ feedback granularity. In some examples, the first HARQ feedback may indicate whether the user equipment successfully received the first downlink transmission.

In some examples, a base station may include means for transmitting a hybrid automatic repeat request (HARQ) configuration specifying a first HARQ feedback granularity and a second HARQ feedback granularity, means for transmitting a first indication specifying that a user equipment is to use the first HARQ feedback granularity, means for transmitting a first downlink transmission after transmitting the first indication, and means for receiving a first HARQ feedback at the first HARQ feedback granularity. In some examples, the first HARQ feedback may indicate whether the user equipment successfully received the first downlink transmission.

In some examples, an article of manufacture for use by a base station includes a non-transitory computer-readable medium having stored therein instructions executable by one or more processors of the base station to transmit a hybrid automatic repeat request (HARQ) configuration specifying a first HARQ feedback granularity and a second HARQ feedback granularity, transmit a first indication specifying that a user equipment is to use the first HARQ feedback granularity, transmit a first downlink transmission after transmitting the first indication, and receive a first HARQ feedback at the first HARQ feedback granularity. In some examples, the first HARQ feedback may indicate whether the user equipment successfully received the first downlink transmission.

One or more of the following features may be applicable to any of the method, the apparatuses, and the computer-readable medium of the preceding paragraphs. The first HARQ feedback granularity may be a first sub-slot granularity and the second HARQ feedback granularity may be a second sub-slot granularity. An additional feature may include generating a resource configuration specifying a plurality of first uplink resources for the first HARQ feedback granularity and a plurality of second uplink resources for the second HARQ feedback granularity and transmitting the resource configuration. In this case, receiving the first HARQ feedback may include receiving the first HARQ feedback on a selected resource of the plurality of first uplink resources. An additional feature may include transmitting a second indication specifying that a user equipment is to use the second HARQ feedback granularity, transmitting a second downlink transmission after transmitting the second indication, and receiving a second HARQ feedback at the second HARQ feedback granularity. Here, the second HARQ feedback may indicate whether the user equipment successfully received the second downlink transmission. An additional feature may include generating a medium access control-control element (MAC-CE) that includes the first indication. In this case, transmitting the first indication may include transmitting the MAC-CE. An additional feature may include generating a first downlink control information (DCI) that includes the first indication. In this case, transmitting the first indication may include transmitting the first DCI. An additional feature may include generating a first downlink control information (DCI) that includes the first indication and schedules the first downlink transmission. In this case, transmitting the first indication may include transmitting the first DCI.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
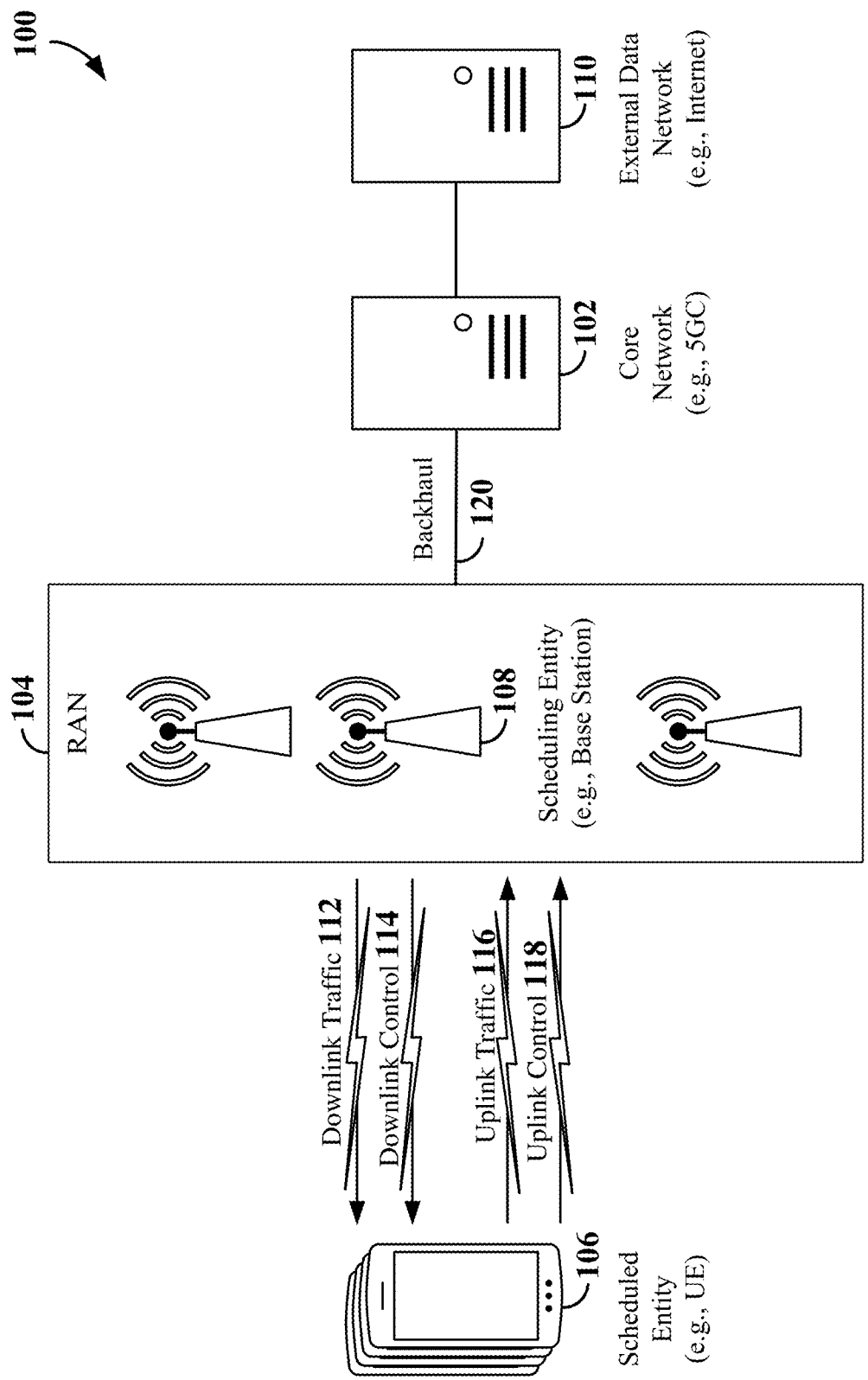
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

A base station may transmit downlink data to a user equipment (UE) at different sub-slot granularities. For example, depending on the downlink traffic to be sent to the UE, the base station may transmit downlink data using a sub-slot granularity of two orthogonal frequency division multiplexing (OFDM) symbols or seven OFDM symbols. In some examples, the smaller sub-slot granularity may be used for traffic with low latency requirements (e.g., ultra-reliable low-latency communication (URLLC) traffic) to enable a UE to send the feedback for the traffic to the base station with less delay than if a larger sub-slot granularity was used.

Various aspects of the disclosure relate to a base station configuring a UE with multiple (e.g., two or more) hybrid automatic repeat request (HARQ) feedback granularities. For example, a first HARQ feedback granularity may be defined for transmitting HARQ feedback in a first quantity of orthogonal frequency division multiplexing (OFDM) symbols (e.g., two OFDM symbols) and a second HARQ feedback granularity may be defined for transmitting HARQ feedback in a second quantity of OFDM symbols (e.g., seven OFDM symbols). The base station may also configure the UE with uplink resources for transmitting at each HARQ granularity (e.g., first uplink resources for transmitting at the first HARQ granularity and second uplink resources for transmitting at the second HARQ feedback granularity).

When the base station has downlink data transmission to send to the UE (e.g., a physical downlink shared channel (PDSCH) transmission) at a particular sub-slot granularity, the base station may send an indication to the UE that specifies which HARQ feedback granularity the UE is to use for sending HARQ feedback. The base station may send this indication to the UE in different ways in different examples. In some examples, the base station sends the indication to the UE via a medium access control-control element (MAC-CE) (e.g., in a physical downlink shared channel (PDSCH)). In some examples, the base station sends the indication to the UE via a downlink control information (DCI) that schedules the downlink data transmission. In some examples, the base station sends the indication to the UE via a first DCI that is different from a second DCI that schedules the downlink data transmission.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
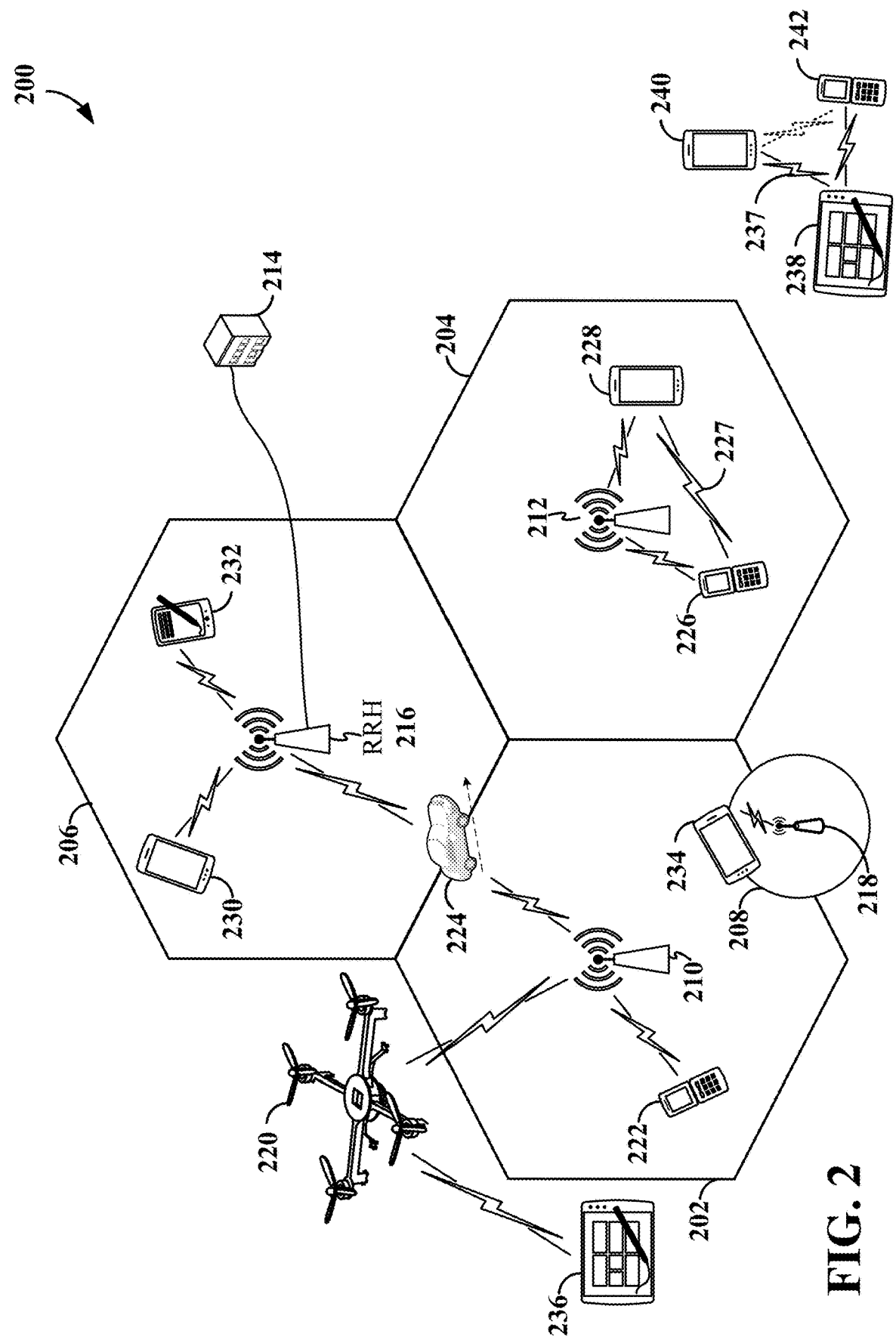
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex (FD) means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
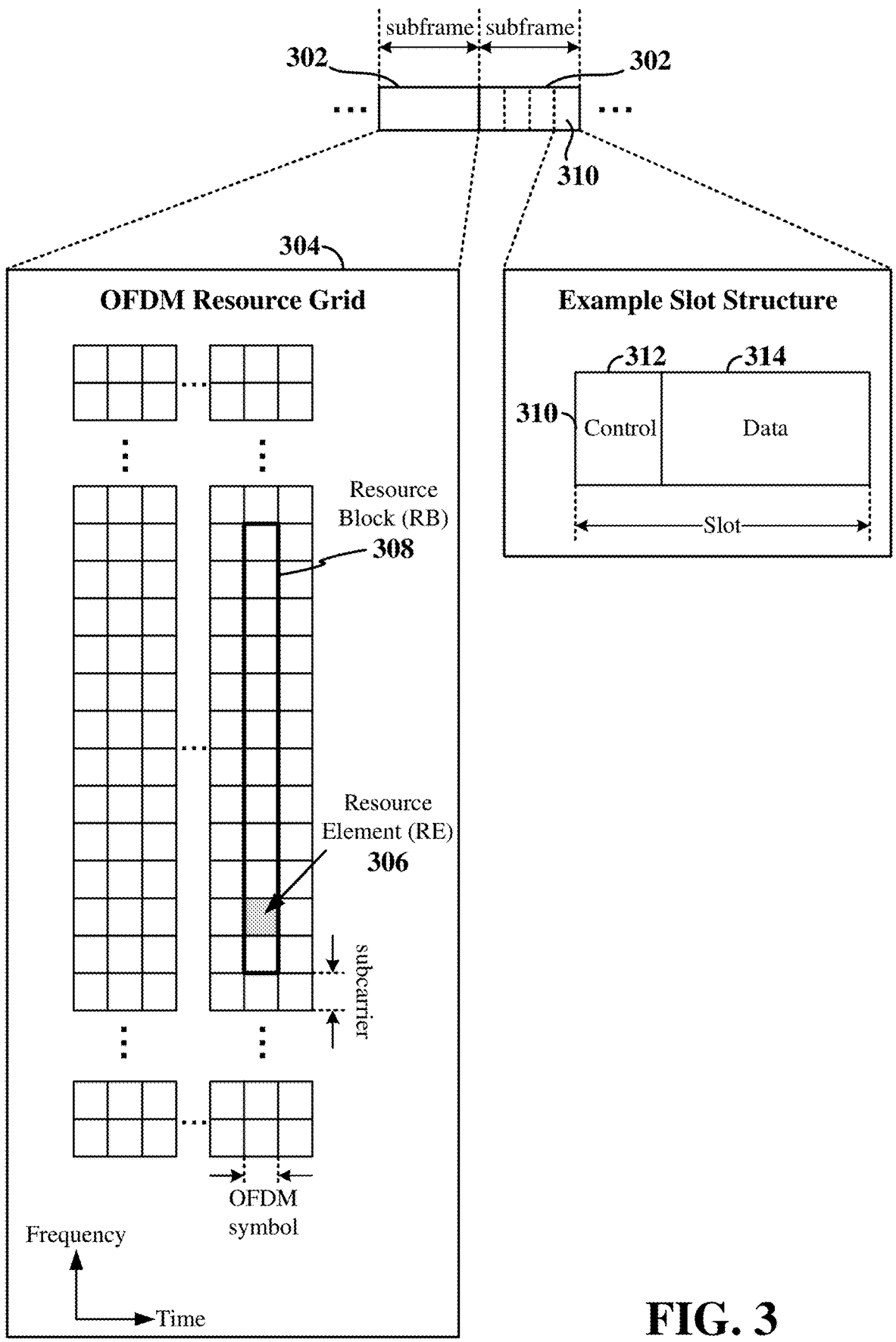
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

A base station may transmit downlink data to a UE at different sub-slot granularities. For example, depending on the downlink traffic to be sent to the UE, the base station may transmit downlink data using a sub-slot granularity of two orthogonal frequency division multiplexing (OFDM) symbols or seven OFDM symbols. In some examples, the smaller sub-slot granularity may be used for traffic with low latency requirements (e.g., ultra-reliable low-latency communication (URLLC) traffic) to enable the UE to send the feedback for the traffic to the base station with less delay than if a larger sub-slot granularity was used. Conversely, the larger sub-slot granularity may be used for traffic with less strict latency requirements (e.g., enhanced mobile broadband (eMBB) traffic).

In some wireless communication systems, only one HARQ-ACK feedback transmission may be sent in an UL slot, while in other wireless communication systems more than one HARQ-ACK feedback transmission may be sent per UL slot. In some examples, a slot is defined with multiple sub-slots. In this case, one or more HARQ-ACK feedback transmissions may be sent in one or more of these sub-slots. In some aspects, this may enable faster HARQ-ACK feedback transmissions for time critical applications (e.g., URLLC). For example, a two OFDM symbol sub-slot configuration can enable up to seven HARQ-ACK feedback transmissions per slot.

In some examples, if the sub-slot configuration is two OFDM symbols, the HARQ-ACK resource may be limited to two OFDM symbols. In some examples, such a sub-slot configuration (limited to two OFDM symbols) may only apply to the HARQ-ACK feedback granularity, such as the parameter K1 (e.g., the time from a PDSCH to a corresponding HARQ-ACK transmission), a HARQ-ACK resource configuration, and a HARQ-ACK resource indication. In these examples, such a sub-slot configuration (limited to two OFDM symbols) might not apply to a PDCCH, a PDSCH, a PUSCH, the parameter K0 (e.g., the time from PDCCH to PDSCH), and the parameter K2 (e.g., the time from a PDCCH that schedules a PUSCH to that PUSCH). In addition, in these examples the sub-slot configuration (limited to two OFDM symbols) might not apply to PUCCH other than HARQ-ACK (e.g., an SR and CSI).

Figure 4:
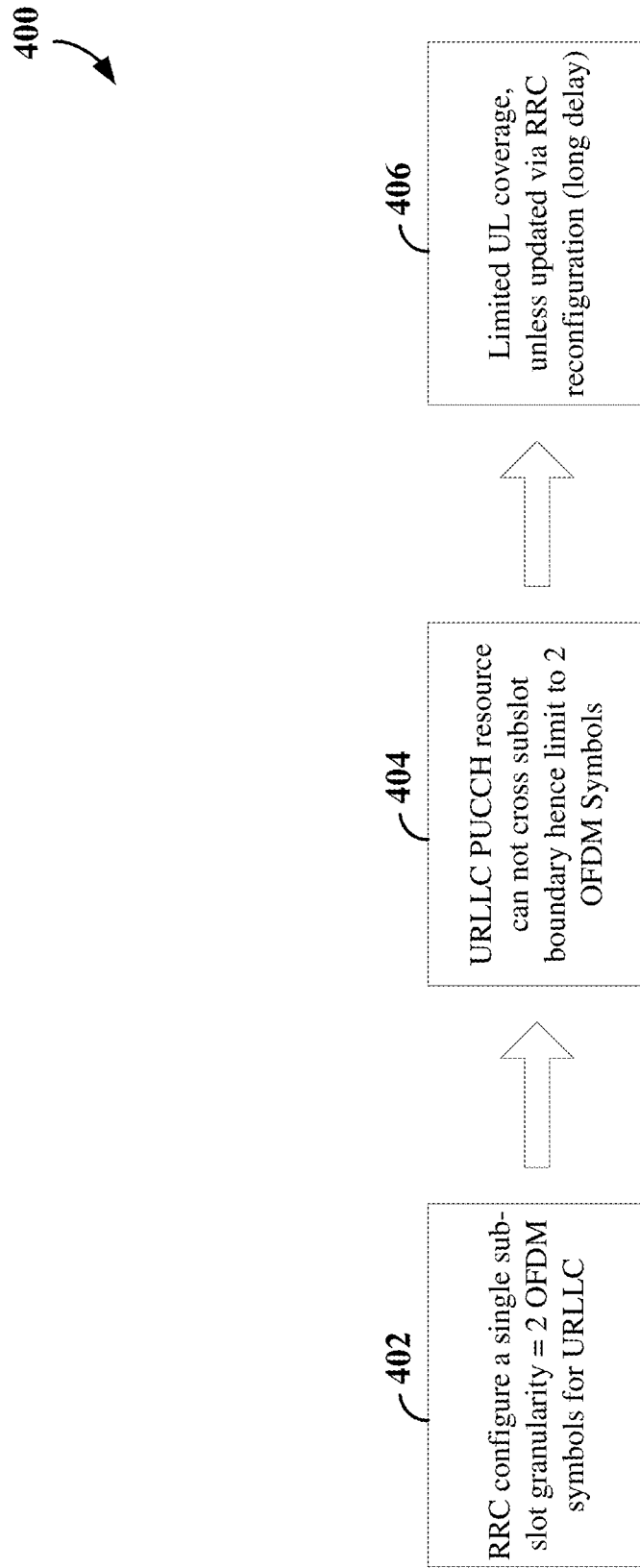
FIG. 4 is a conceptual illustration of an example configuration of a single sub-slot granularity according to some aspects.

In some wireless communication systems, only one sub-slot configuration is allowed for a UE. For example, as shown in the diagram 400 of FIG. 4, a radio resource control (RRC) reconfiguration is used to configure a single sub-slot granularity of two OFDM symbols for URLLC at block 402. As indicated at block 404, the URLLC PUCCH resource cannot cross a sub-slot boundary. Thus, according to this configuration, the HARQ feedback is limited to two OFDM symbols in one sub-slot. As indicated at block 406, this restriction limits the UL coverage (e.g., the HARQ feedback might not have sufficient energy to reach the base station due to the two OFDM symbol restriction). If the base station wants to change the sub-slot configuration (e.g., to improve the UL coverage), the base station sends another RRC reconfiguration. However, an RRC reconfiguration imposes a relatively long delay (e.g., on the order of 10 milliseconds as one example). Consequently, this approach may not be well suited for some types of service (e.g., URLLC service).

The disclosure relates in some aspects to a base station configuring a UE with multiple (e.g., two or more) HARQ feedback granularities. For example, a first HARQ feedback granularity may be defined for transmitting HARQ feedback in a first quantity of OFDM symbols (e.g., two OFDM symbols) and a second HARQ feedback granularity may be defined for transmitting HARQ feedback in a second quantity of OFDM symbols (e.g., seven OFDM symbols).

The base station may subsequently signal the UE to dynamically switch between sub-slot configurations. For example, the base station may send an indication to the UE that specifies the sub-slot granularity (e.g., the HARQ feedback granularity) that the UE is to use (e.g., depending on the downlink data transmitted to the UE).

Figure 5:
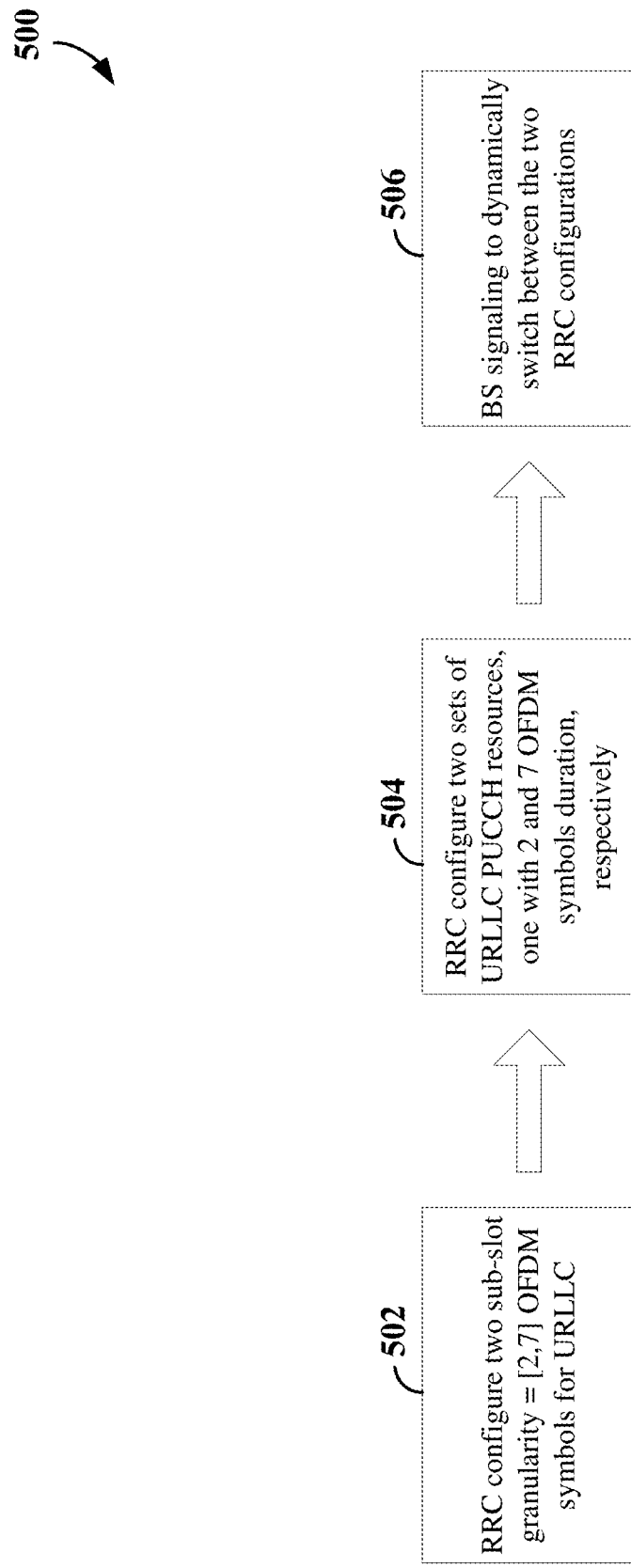
FIG. 5 is a conceptual illustration of an example configuration of multiple sub-slot granularities according to some aspects.

For example, as shown in the diagram 500 of FIG. 5, the base station sends a first RRC reconfiguration to configure the UE with two (or more) sets of RRC configurations for URLLC (e.g., sub-slot granularity, K1 interpretation, sub-slot granularity for HARQ-ACK lookback window, PUCCH resource sets configuration). As one example, the base station may configure two sub-slot granularities (e.g., two OFDM symbols or seven OFDM symbols for URLLC) at block 502. Here, the seven symbol sub-slot configuration may be defined for better coverage, and the two symbol sub-slot configuration may be defined for a faster HARQ timeline.

As indicated at block 504, the base station sends a second RRC reconfiguration to configure the UE with two sets of uplink resources (e.g., URLLC PUCCH resources). For example, a two OFDM symbol uplink resource may be scheduled for the two symbol sub-slot granularity and a seven OFDM symbol uplink resource may be scheduled for the seven symbol sub-slot granularity.

As indicated at block 506, the base station may subsequently signal the UE to dynamically switch between the two RRC configurations as needed (e.g., to improve the operating flexibility). For example, a decision to switch to a different RRC configuration (e.g., switch to a different HARQ configuration with a different feedback granularity) may depend on whether faster HARQ feedback is needed or better HARQ feedback coverage is needed.

The disclosure relates in some aspects to different approaches for dynamically signaling a switch from using one HARQ configuration to another HARQ configuration.

In some examples, a base station uses a DCI to signal a switch between different sub-slot granularities. For example, X number of bits may be included in a DCI to indicate which sub-slot granularity is to be used. As one example, one bit may specify either a two symbol granularity (e.g., bit=zero (0)) or a seven symbol granularity (e.g., bit=one (1)).

In some examples, each DCI that schedules a PDSCH may include an indication that specifies for a UE that the HARQ-ACK of this PDSCH is to follow a particular sub-slot granularity. In this case, the granularity may be uniquely specified for each PDSCH.

In some examples, a special DCI (or a group common (GC) DCI) may include an indication that specifies for a UE (or a group of UEs) that the HARQ-ACK of subsequent PDSCHs are to follow a particular sub-slot granularity. In this case, the overhead associated with the indication may be lower than in the previous example (e.g., a single indication may cover all subsequent HARQ-ACK transmissions until another indication is provided to the UE). However, since the indication may be sent less frequency in this case, a dropped DCI (e.g., due to changing channel conditions) may adversely affect multiple HARQ-ACK transmissions.

In some examples, a base station uses a MAC-CE to signal a switch between different sub-slot granularities. This approach may provide a faster switch time (e.g., on the order of three milliseconds in some examples) as compared to using an RRC configuration to signal a switch between different sub-slot granularities. In this case, a different granularity could be uniquely specified for each PDSCH. In addition, using a MAC-CE may avoid some of the problems that may be associated with using a DCI to signal a switch between different sub-slot granularities as discussed below.

Figure 6:
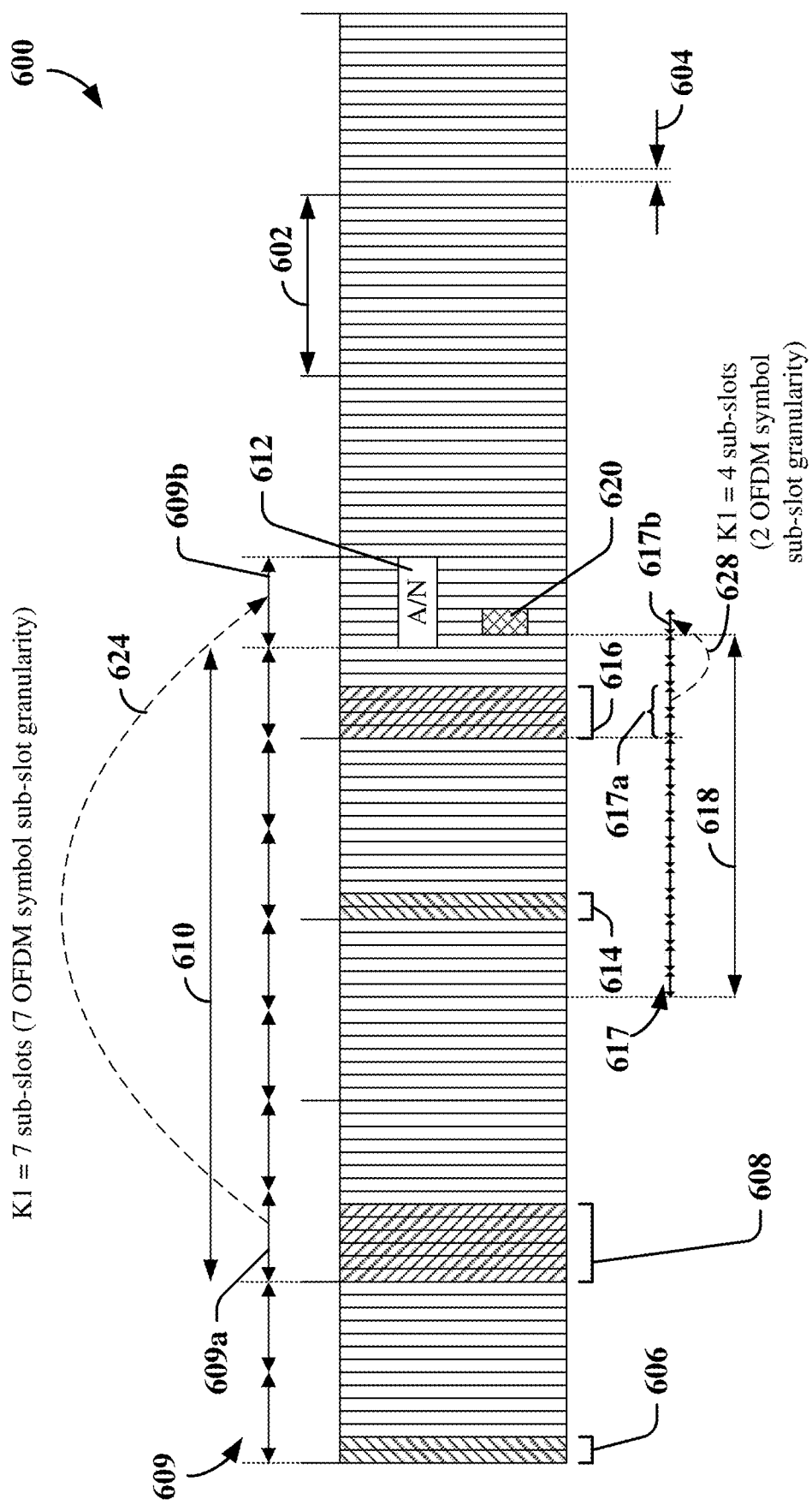
FIG. 6 is a conceptual illustration of an example of a first transmission at a first sub-slot granularity, a second transmission at a second sub-slot granularity, and associated hybrid automatic repeat request (HARQ) feedback transmissions according to some aspects.

FIG. 6 illustrates an example 600 of time slots (e.g., with a time slot duration 602) for communication between a base station and a UE (not shown in FIG. 6). Here, each time slot (which may be referred to simply as a slot) includes 14 symbols (e.g., with a symbol duration 604).

A first DCI in symbols 606 schedules a first PDSCH transmission in symbols 608. In this example, the first DCI indicates that the sub-slot granularity is seven OFDM symbols. A corresponding set of seven-symbol sub-slots 609 starting at the first DCI are shown in FIG. 6. In this example, the symbols 608 for the first PDSCH fall within a sub-slot 609a of the set of seven-symbol sub-slots 609.

The HARQ-ACK process for the first PDSCH transmission uses a lookback window 610 for transmitting an ACK/

NACK (A/N) 612. The lookback window 610 specifies a range of symbols that may follow the seven OFDM symbols per sub-slot granularity. A parameter K1 (which is defined based on the specified sub-slot granularity: seven OFDM symbols per sub-slot in this case) indicates when the UE is to send HARQ-ACK feedback for the first PDSCH. In this example, K1 is equal to seven (7), indicating (as represented by a dashed arrow 624) that the ACK/NACK 612 is sent seven sub-slots after the sub-slot 609*a* that carries the first PDSCH. Thus, the ACK/NACK 612 is sent in a sub-slot 609*b* of the set of seven-symbol sub-slots 609.

A second DCI in symbols 614 schedules a second PDSCH transmission in symbols 616. In this example, the second DCI indicates that the sub-slot granularity is two OFDM symbols. A corresponding set of two-symbol sub-slots 617 starting at the second DCI are shown in FIG. 6. In this example, the symbols 616 for the second PDSCH fall within two sub-slots 617*a* of the set of two-symbol sub-slots 617.

The HARQ-ACK process for the second PDSCH transmission uses a lookback window 618 for transmitting an ACK/NACK (A/N) 620. The lookback window 618 specifies a range of symbols that may follow the two OFDM symbols per sub-slot granularity. A parameter K1 (which is defined based on the specified sub-slot granularity: two OFDM symbols per sub-slot in this case) indicates when the UE is to send HARQ-ACK feedback for the second PDSCH. In this example, K1 is equal to three (3), indicating (as represented by a dashed arrow 628) that the ACK/NACK 620 is sent three sub-slots after the last sub-slot of the two sub-slots 617*a* for the second PDSCH. Thus, the ACK/NACK 620 is sent in a sub-slot 617*b* of the set of two-symbol sub-slots 617.

A UE may use a HARQ-ACK codebook to transmit an ACK/NACK. In some aspects, a HARQ-ACK codebook may map a value (e.g., a zero or a one, etc.) to a set of values (e.g., a set of complex values) for transmission. To support different sub-slot granularities, a UE may maintain multiple HARQ-ACK codebooks simultaneously, one for each sub-slot configuration. That is, different HARQ-ACK codebooks may be defined for ACK/NACKs of different sub-slot granularities. Thus, in the example of FIG. 6, the UE may maintain a first HARQ-ACK codebook for the two-OFDM symbol sub-slots and a second HARQ-ACK codebook for the seven-OFDM symbol sub-slots.

A base station may use a downlink assignment index (DAI) to configure the HARQ-ACK transmissions by a UE. A DAI may include a counter that indicates how many bits the UE is to transmit in a HARQ-ACK transmission. For example, if an ACK/NACK for a single PDSCH is to be transmitted in a scheduled HARQ-ACK transmission, the DAI counter may be set to a value of one. If, however, the ACK/NACKs for two PDSCHs are to be merged into a single scheduled HARQ-ACK transmission, the DAI counter may be set to a value of two, and so on.

Thus, in some aspects, a DAI may indicate how many ACK/NACK bits the UE is to transmit for a given HARQ-ACK codebook. As discussed above, the number of bits depends on how many PDSCHs are covered by the HARQ-ACK.

Since a UE may maintain multiple HARQ-ACK codebooks when multiple sub-slot granularities are supported (as discussed above), the base station will signal separate DAIs for the different HARQ-ACK codebooks. For example, a first DAI may include a first counter for the first PDSCH of FIG. 6 and a second DAI may include a second counter for the second PDSCH of FIG. 6. For PDSCHs that fall into both lookback windows, the UE will follow the indication (e.g., 1 bit indication) in each DCI to decide which HARQ-ACK goes to which HARQ-ACK codebook. As a result of the above (e.g., the use of multiple codebooks, multiple DAIs, overlapping lookback windows), the use of a DCI to signal the sub-slot granularity may result in increased UE implementation complexity.

In addition, in some scenarios, use of a DCI to signal the sub-slot granularity may result in the HARQ-ACK codebooks overlapping (at least in part) in the time domain.

Figure 7:
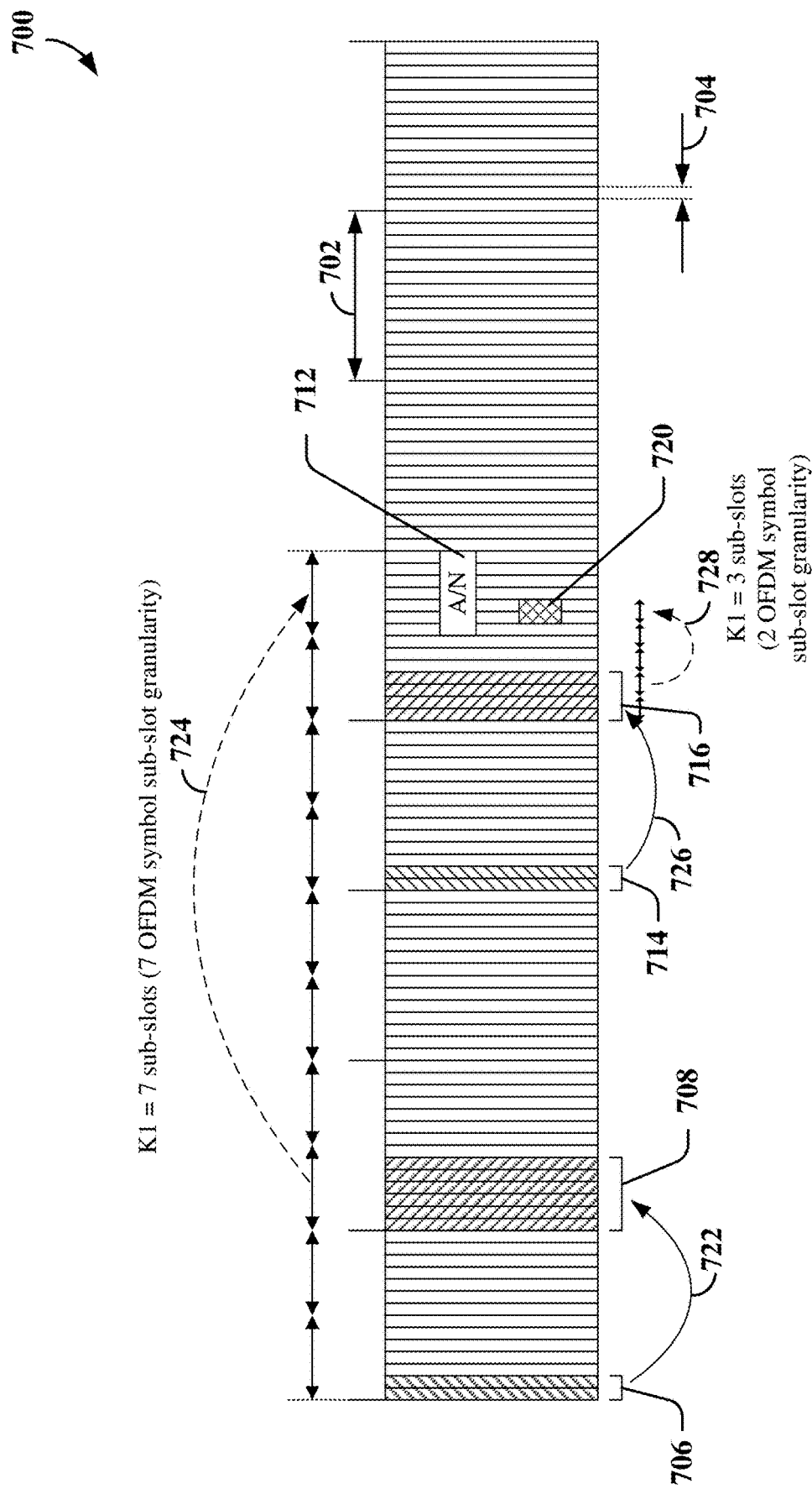
FIG. 7 is a conceptual illustration of another example of a first transmission at a first sub-slot granularity, a second transmission at a second sub-slot granularity, and associated hybrid automatic repeat request (HARQ) feedback transmissions according to some aspects.

FIG. 7 illustrates an example 700 of slots (e.g., with a slot duration 702) for communication between a base station and a UE (not shown in FIG. 7). Each slot includes 14 symbols (e.g., with a symbol duration 704).

A first DCI in symbols 706 schedules (as represented by an arrow 722) a first PDSCH transmission in symbols 708. In this example, the first DCI indicates that the sub-slot granularity is seven OFDM symbols. The parameter K1 724 is seven (7) in this example (with a granularity of seven OFDM symbols per sub-slot). Thus, the ACK/NACK (A/N) 712 for the seven-OFDM symbol sub-slots may be transmitted seven sub-slots after the first PDSCH transmission as shown in FIG. 7.

A second DCI in symbols 714 schedules (as represented by an arrow 726) a second PDSCH transmission in symbols 716. In this example, the second DCI indicates that the sub-slot granularity is two OFDM symbols. The parameter K1 728 is three (3) in this example (with a granularity of two OFDM symbols per sub-slot). Thus, the ACK/NACK (A/N) 720 for the two-OFDM symbol sub-slots may be transmitted three sub-slots after the last sub-slot of the second PDSCH transmission as shown in FIG. 7.

In the example of FIG. 7, the PUCCH resources for the HARQ-ACK codebooks overlap (i.e., the ACK/NACK 712 overlaps in time with the ACK/NACK 720). Since transmitting multiple HARQ feedbacks (A/Ns) at the same time might not be allowed (e.g., on the same carrier), the disclosure relates in some aspects to merging (e.g., multiplexing, combining, etc.) the codebooks so that multiple HARQ feedbacks may be sent via a single merged codebook. Codebooks may be merged in different ways in different examples. In some examples, merging codebooks involves concatenating the codebooks (e.g., appending one codebook after another codebook). Codebooks may be merged in other ways in other examples.

In some examples, the codebooks are merged into the codebook with the earliest PUCCH transmission. For the example of FIG. 7, this may involve transmitting the merged codebook via the PUCCH resources for the ACK/NACK 712 and using the sub-slot granularity specified by the first DCI. Thus, the merged codebook is transmitted as soon as possible (e.g., to facilitate timely HARQ feedback for low latency traffic). In this case, the PUCCH resources may change after the merger. For example, the UE may derive new PUCCH resources based on the payload size (and the base station may mirror this derivation of the new PUCCH resource). In this case, more symbols than were previously allocated may be used to transmit the merged codebook. Also, transmission of the merged codebook could commence at a later symbol than the first symbol of the allocated PUCCH resource. Thus, action may be taken by the UE and/or base station in the event the merger results in (or to prevent the merger resulting in) a violation of the HARQ-ACK timeline for one or more ACK/NACKs (e.g., the ACK/NACK 720).

In some examples, the merged codebooks are transmitted via the PUCCH resources with the largest sub-slot duration (e.g., the largest number of OFDM symbols). For the example of FIG. 7, this may involve transmitting the merged codebook via the PUCCH resources for the ACK/NACK 712 and using the sub-slot granularity specified by the first DCI. In this way, better HARQ-ACK coverage may be provided (e.g., due to the use of seven symbols). However, action may need to be taken in the event the merger results in (or to prevent the merger resulting in) a violation of the HARQ-ACK timeline for one or more ACK/NACKs (e.g., the ACK/NACK 720).

In some examples, the merged codebooks are transmitted via the PUCCH resources that follow the last received DCI. For the example of FIG. 7, this may involve transmitting the merged codebook via the PUCCH resources for the ACK/NACK 720 and using the sub-slot granularity specified by the second DCI. To avoid the scenario where such a merger might not provide sufficient coverage for the ACK/NACK 712, the base station may determine ahead of time whether a schedule will result in this scenario and use a different schedule (or increase the transmit power for the UE PUCCH transmission) if needed.

Figure 8:
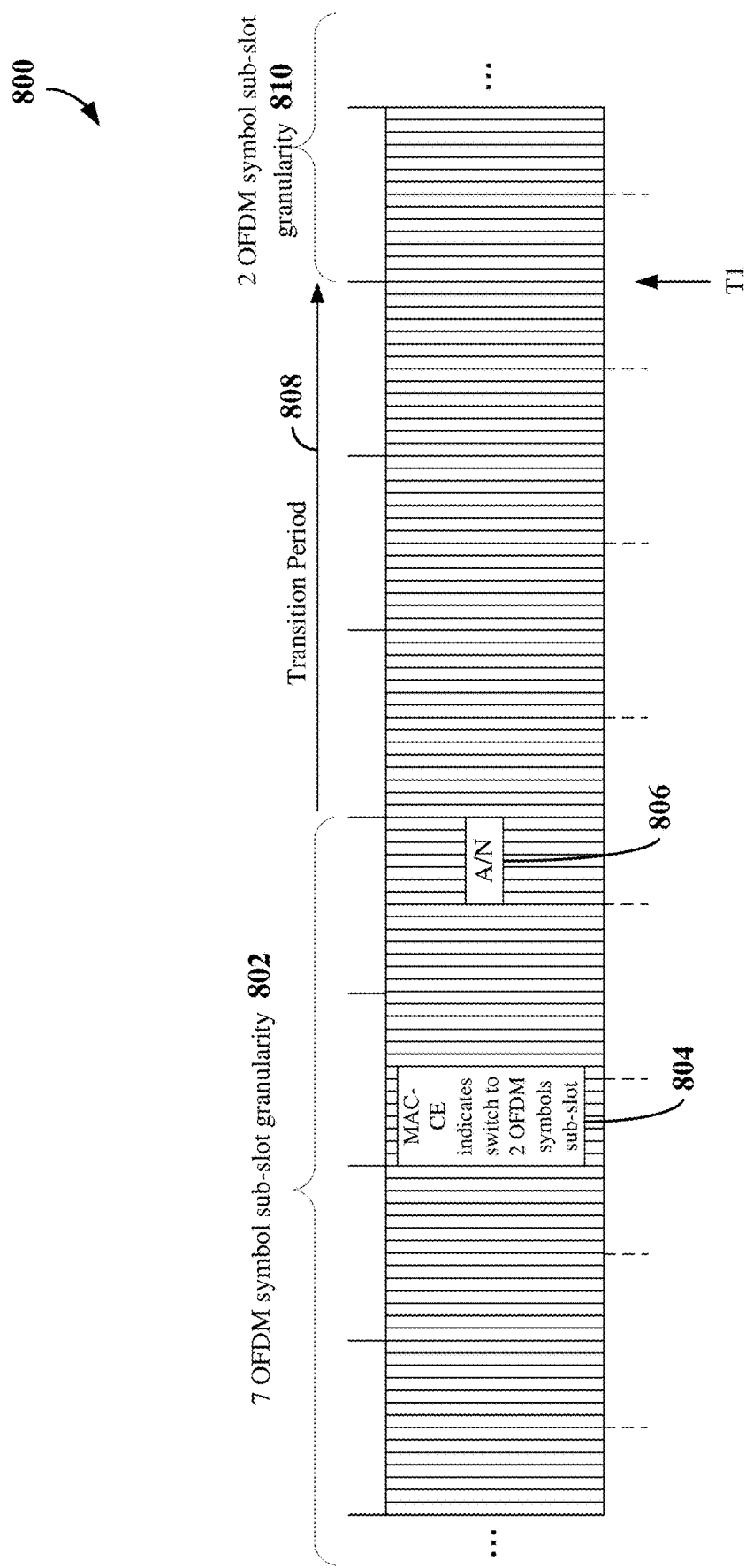
FIG. 8 is a conceptual illustration of an example of signaling an indication of a HARQ feedback granularity via a medium access control-control element (MAC-CE) according to some aspects.

FIG. 8 illustrates an example 800 of using a MAC-CE for a base station (not shown in FIG. 8) to signal the sub-slot granularity to a UE (not shown in FIG. 8). Initially, the base station has configured the UE to use a seven-OFDM symbol sub-slot granularity (as represented by a bracket 802). Subsequently, the base station sends a MAC-CE 804 (via a PDSCH) that indicates a switch to a two-OFDM symbol sub-slot granularity. Upon successful decoding of the PDSCH, the UE sends an ACK/NACK (A/N) 806 thereby indicating whether the UE successfully received the MAC-CE. Within a defined transition period 808 (e.g., within a three millisecond appliance time) after transmitting the ACK/NACK 806, the UE switches to the new sub-slot granularity (e.g., at a time T1). Subsequently, UE uses the two-OFDM symbol sub-slot granularity (as represented by a bracket 810).

Upon successful receipt of the HARQ-ACK feedback for the MAC-CE, if an ACK is indicated in the HARQ-ACK feedback for the MAC-CE, the base station may assume that the UE successfully switched to the new sub-slot granularity at a time calculated as the time of transmission of the ACK for the MAC-CE plus the transition period 808 (e.g., three milliseconds). In some examples, the base station does not schedule a PDSCH in the transition period 808. In some examples, the base station may still schedule a PDSCH in the transition period 808.

Upon successful receipt of the HARQ-ACK feedback for the MAC-CE, if a NACK is indicated in the HARQ-ACK feedback for the MAC-CE, the base station may assume that the UE did not successfully decode the MAC-CE. In this case, the base station will continue using the old sub-slot granularity (i.e., the base station does not switch to the new sub-slot granularity).

In some examples, there is no HARQ-ACK carry over before and after the transition period 808. In some examples, by the new sub-slot granularity action time (e.g., by time T1), any unsent HARQ-ACKs based on the previous sub-slot granularity may be dropped.

Alternatively, in other examples, a UE may send HARQ-ARQ for PDSCH traffic that was received prior to sending the ACK/NACK 806, even if this results in sending the HARQ-ARQ after the new sub-slot granularity action time (e.g., after time T1). In this case, the base station may account for receiving a HARQ-ARQ transmission at the prior granularity.

Figure 9:
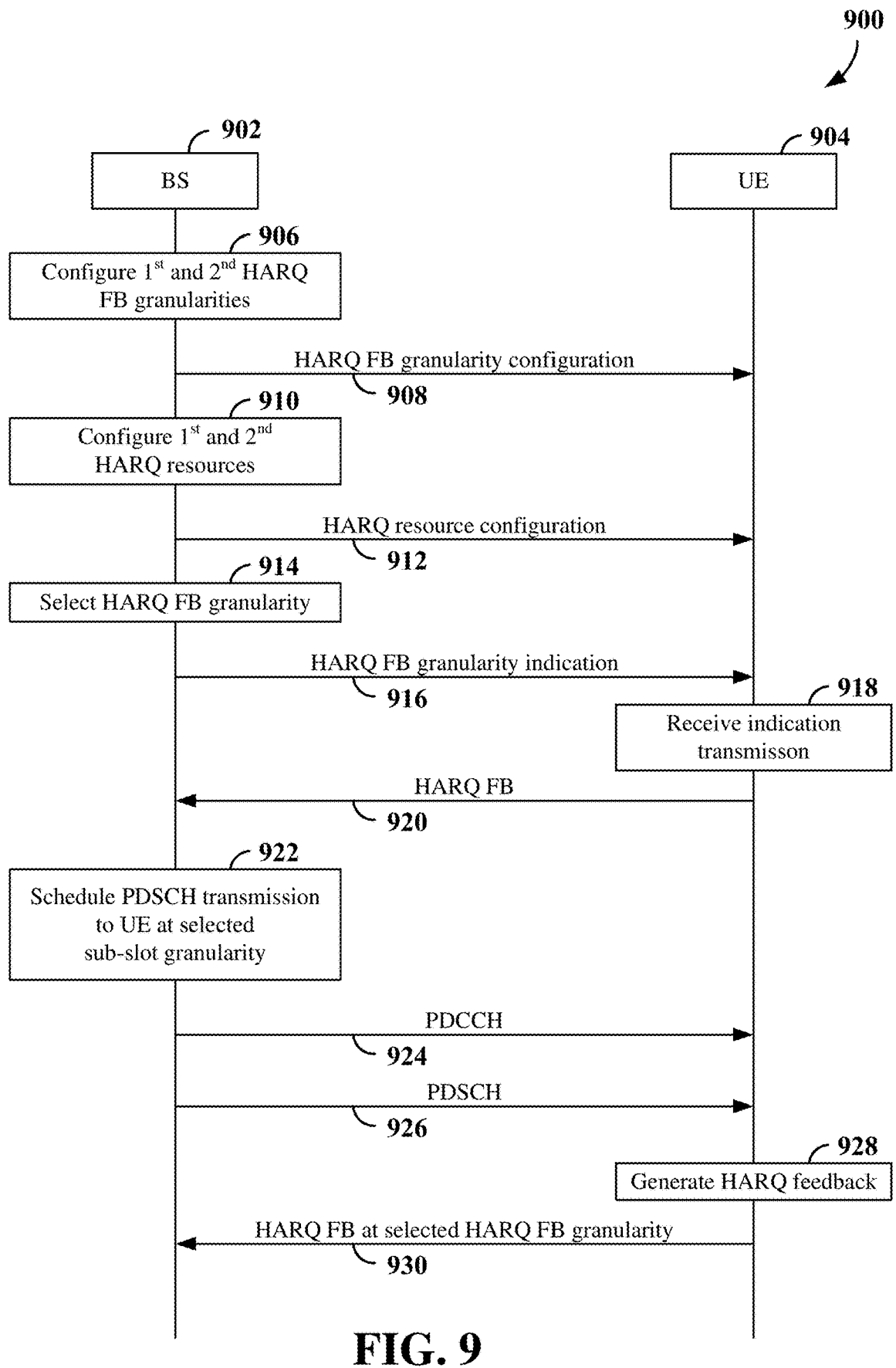
FIG. 9 is a signaling diagram illustrating an example of HARQ feedback granularity-related signaling between a user equipment and a base station according to some aspects.

FIG. 9 illustrates an example of HARQ configuration-related signaling 900 in a wireless communication network including a BS 902 and a UE 904. In some examples, the BS 902 may correspond to one or more of the BSs or scheduling entities shown in any one or more of FIGS. 1, 2, 10 and 14. In some examples, the UE 904 may correspond to any of the UEs or scheduled entities shown in any one or more of FIGS. 1, 2, 10 and 11.

At 906 of FIG. 9, the BS 902 configures a first HARQ feedback granularity and a second HARQ feedback granularity. For example, the BS 902 may specify a first HARQ feedback granularity of two OFDM symbols and a second HARQ feedback granularity of seven OFDM symbols. Other HARQ feedback granularity values and/or other numbers of HARQ feedback granularities (e.g., three or more) may be used in other examples.

At 908, the BS 902 transmits the HARQ feedback granularity configuration to the UE 904. For example, the BS 902 may transmit an RRC configuration message that includes the HARQ feedback granularity configuration.

At 910, the BS 902 configures a first HARQ resource for the first HARQ feedback granularity and a second HARQ resource for the second HARQ feedback granularity. For example, the BS 902 may specify a two OFDM symbol PUCCH resource for a first HARQ feedback granularity of two OFDM symbols and a seven OFDM symbol PUCCH resource for a second HARQ feedback granularity of seven OFDM symbols.

At 912, the BS 902 transmits a HARQ resource configuration to the UE 904 that specifies the first HARQ resource and the second HARQ resource. For example, the BS 902 may transmit an RRC configuration message that includes the HARQ resource configuration.

At 914, the BS 902 selects a particular HARQ feedback granularity for the UE to use. For example, the BS 902 may need to schedule a PDSCH transmission to the UE that uses a two sub-slot granularity. As a result, the BS 902 may select a two OFDM symbol HARQ feedback granularity for the UE to use when sending HARQ feedback for the PDSCH data transmission.

In some examples, the BS 902 may select the indication at 914 to change the HARQ feedback granularity used by the UE. For example, the BS 902 may have previously configured the UE 904 to use a different HARQ feedback granularity for a previous downlink transmission. As one example, the BS 902 may have previously configured the UE 904 to use a seven symbol HARQ feedback granularity for an enhanced mobile broadband (eMBB) downlink transmission that used a seven symbol sub-slot granularity.

At 916, the BS 902 transmits an indication to the UE 904 that specifies the HARQ feedback granularity selected at 914. For example, the BS 902 may transmit a PDSCH that includes a MAC-CE, where the indication is in the MAC-CE. As another example, the BS 902 may transmit a special DCI that includes the indication (e.g., as discussed herein). The BS 902 may transmit the indication in other ways in other examples.

At 918, the UE 904 may receive a transmission (e.g., a MAC-CE or a special DCI) including the indication. At 920, the UE may transmit HARQ feedback indicating whether the UE successfully received the indication (e.g., indicating whether the UE successfully decoded a PDSCH carrying the indication).

At 922, the BS 902 schedules a PDSCH transmission to the UE at a selected sub-slot granularity. For example, as mentioned above, the BS 902 may need to schedule a PDSCH transmission (e.g., a URLLC data transmission) to the UE that uses a two sub-slot granularity. In examples where the BS 902 sends the indication of 916 in a MAC-CE in PDSCH, the scheduling of the PDSCH transmission may depend on whether the HARQ feedback of 920 indicated that the UE successfully received the indication.

At 924, the BS 902 transmits a PDCCH that schedules the PDSCH transmission. For example, the PDCCH may include a DCI that schedules the PDSCH transmission. The HARQ-ACK feedback for the PDSCH follows the granularity indicated in 916. Also as mentioned above, in some examples, (e.g., when the indication of 916 is sent via a MAC-CE), the BS 902 may wait a defined period of time (e.g., three ms) after receiving an ACK at 920 to schedule the PDSCH.

At 926, the BS 902 transmits the PDSCH. For example, the BS 902 may transmit URLLC data at a two sub-slot granularity.

At 928, upon receiving the PDCCH at 924 and the PDSCH at 926, the UE 904 generates HARQ feedback (an ACK or a NACK) indicating whether the UE 904 successfully received the PDSCH at 926. The UE 904 then transmits the HARQ feedback at the selected HARQ feedback granularity to the BS 902 at 930.

Figure 10:
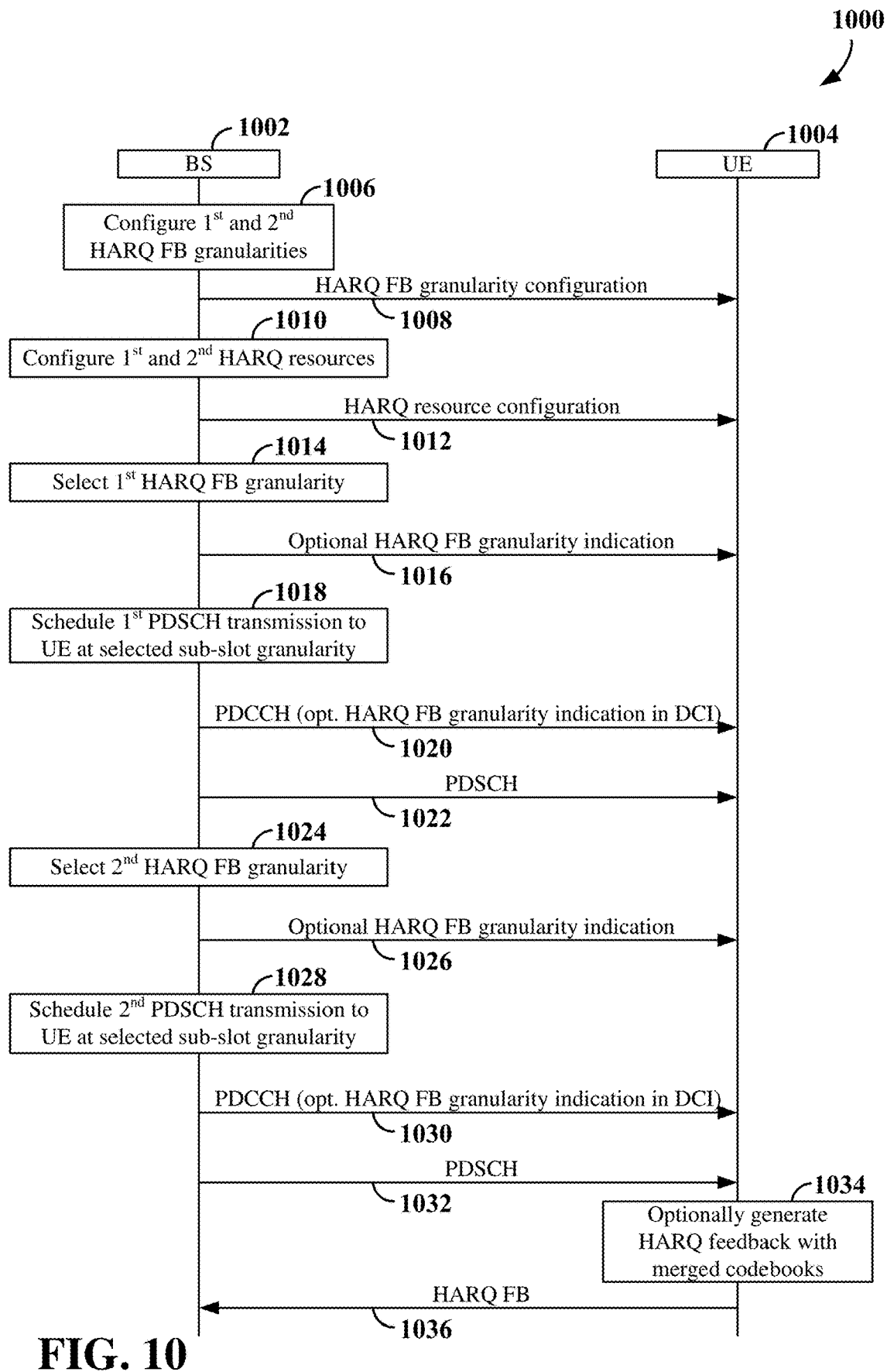
FIG. 10 is a signaling diagram illustrating another example of HARQ feedback granularity-related signaling between a user equipment and a base station according to some aspects.

FIG. 10 illustrates another example of HARQ configuration-related signaling 1000 in a wireless communication network including a BS 1002 and a UE 1004. In some examples, the BS 1002 may correspond to one or more of the BSs or scheduling entities shown in any one or more of FIGS. 1, 2, 9 and 14. In some examples, the UE 1004 may correspond to any of the UEs or scheduled entities shown in any one or more of FIGS. 1, 2, 9 and 11.

At 1006 of FIG. 10, the BS 1002 configures a first HARQ feedback granularity and a second HARQ feedback granularity. For example, the BS 1002 may specify a first HARQ feedback granularity of two OFDM symbols and a second HARQ feedback granularity of seven OFDM symbols. Other HARQ feedback granularity values and/or other numbers of HARQ feedback granularities (e.g., three or more) may be used in other examples.

At 1008, the BS 1002 transmits the HARQ feedback granularity configuration to the UE 1004. For example, the BS 1002 may transmit an RRC configuration message that includes the HARQ feedback granularity configuration.

At 1010, the BS 1002 configures a first HARQ resource for the first HARQ feedback granularity and a second HARQ resource for the second HARQ feedback granularity. For example, the BS 1002 may specify a two OFDM symbol PUCCH resource for a first HARQ feedback granularity of two OFDM symbols and a seven OFDM symbol PUCCH resource for a second HARQ feedback granularity of seven OFDM symbols.

At 1012, the BS 1002 transmits a HARQ resource configuration to the UE 1004 that specifies the first HARQ resource and the second HARQ resource. For example, the BS 1002 may transmit an RRC configuration message that includes the HARQ resource configuration.

At 1014, the BS 1002 selects a first HARQ feedback granularity for the UE to use. For example, the BS 1002 may need to schedule a PDSCH transmission (e.g., a URLLC data transmission) to the UE that uses a two sub-slot granularity. As a result, the BS 1002 may select a two OFDM symbol HARQ feedback granularity for the UE to use when sending HARQ feedback for the PDSCH data transmission.

At optional 1016, the BS 1002 may transmit an indication to the UE 1004 that specifies the first HARQ feedback granularity selected at 1014. For example, the BS 1002 may transmit a special DCI that includes the indication. In another example, the BS 1002 may transmit a MAC-CE that includes the indication. The BS 1002 may transmit the indication in other ways in other examples.

At 1018, the BS 1002 schedules a PDSCH transmission to the UE at a selected sub-slot granularity. For example, as mentioned above, the BS 1002 may need to schedule a PDSCH transmission (e.g., a URLLC data transmission) to the UE that uses a two sub-slot granularity.

At 1020, the BS 1002 transmits a PDCCH that schedules the first PDSCH transmission. For example, the PDCCH may include a DCI that schedules the PDSCH transmission. As mentioned above, in some examples, a DCI that schedules the PDSCH transmission may include the indication of the selected HARQ feedback granularity. In this case, the indication of 1016 would not be sent.

At 1022, the BS 1002 transmits the PDSCH. For example, the BS 1002 may transmit URLLC data at a two sub-slot granularity.

At 1024, the BS 1002 selects a second HARQ feedback granularity for the UE to use. For example, the BS 1002 may need to schedule a PDSCH transmission (e.g., an enhanced mobile broadband (eMBB) downlink transmission) to the UE that uses a seven sub-slot granularity. As a result, the BS 1002 may select a seven OFDM symbol HARQ feedback granularity for the UE to use when sending HARQ feedback for this PDSCH data transmission.

At optional 1026, the BS 1002 may transmit an indication to the UE 1004 that specifies the second HARQ feedback granularity selected at 1024. For example, the BS 1002 may transmit a special DCI that includes the indication. In another example, the BS 1002 may transmit a MAC-CE that includes the indication. The BS 1002 may transmit the indication in other ways in other examples.

At 1028, the BS 1002 schedules a second PDSCH transmission to the UE at a selected sub-slot granularity. For example, as mentioned above, the BS 1002 may need to schedule a PDSCH transmission (e.g., an eMBB data transmission) to the UE that uses a seven sub-slot granularity.

At 1030, the BS 1002 transmits a PDCCH that schedules the second PDSCH transmission. For example, the PDCCH may include a DCI that schedules the PDSCH transmission. As mentioned above, in some examples, a DCI that schedules the PDSCH transmission may include the indication of the selected HARQ feedback granularity. In this case, the indication of 1026 would not be sent.

At 1032, the BS 1002 transmits the PDSCH. For example, the BS 1002 may transmit eMBB data at a seven sub-slot granularity.

At 1034, upon receiving the PDSCH at 1022 and the PDSCH at 1032, the UE 1004 generates HARQ feedback (e.g., an ACK or a NACK) indicating whether the UE 1004 successfully received each PDSCH. Here, the UE 1004 may generate a first HARQ codebook for a first HARQ feedback for the PDSCH received at 1022 and a second HARQ codebook for a second HARQ feedback for the PDSCH received at 1032. In examples where the HARQ feedback resources overlap (e.g., overlap at least in part), the UE 1004 may merge the first HARQ codebook and the second HARQ codebook (e.g., as discussed herein).

The UE 1004 then transmits the HARQ feedback at a particular HARQ feedback granularity to the BS 1002 at 1036. In examples where the HARQ feedback resources do not overlap, the UE 1004 may transmit the first HARQ codebook at the first HARQ feedback granularity and transmit the second HARQ codebook at the first HARQ feedback granularity. In examples where the HARQ feedback resource overlap (e.g., overlap at least in part), the UE 1004 may transmit the merged HARQ codebook at a HARQ feedback granularity that corresponds to the manner in which the HARQ codebooks were merged (e.g., as discussed herein).

Figure 11:
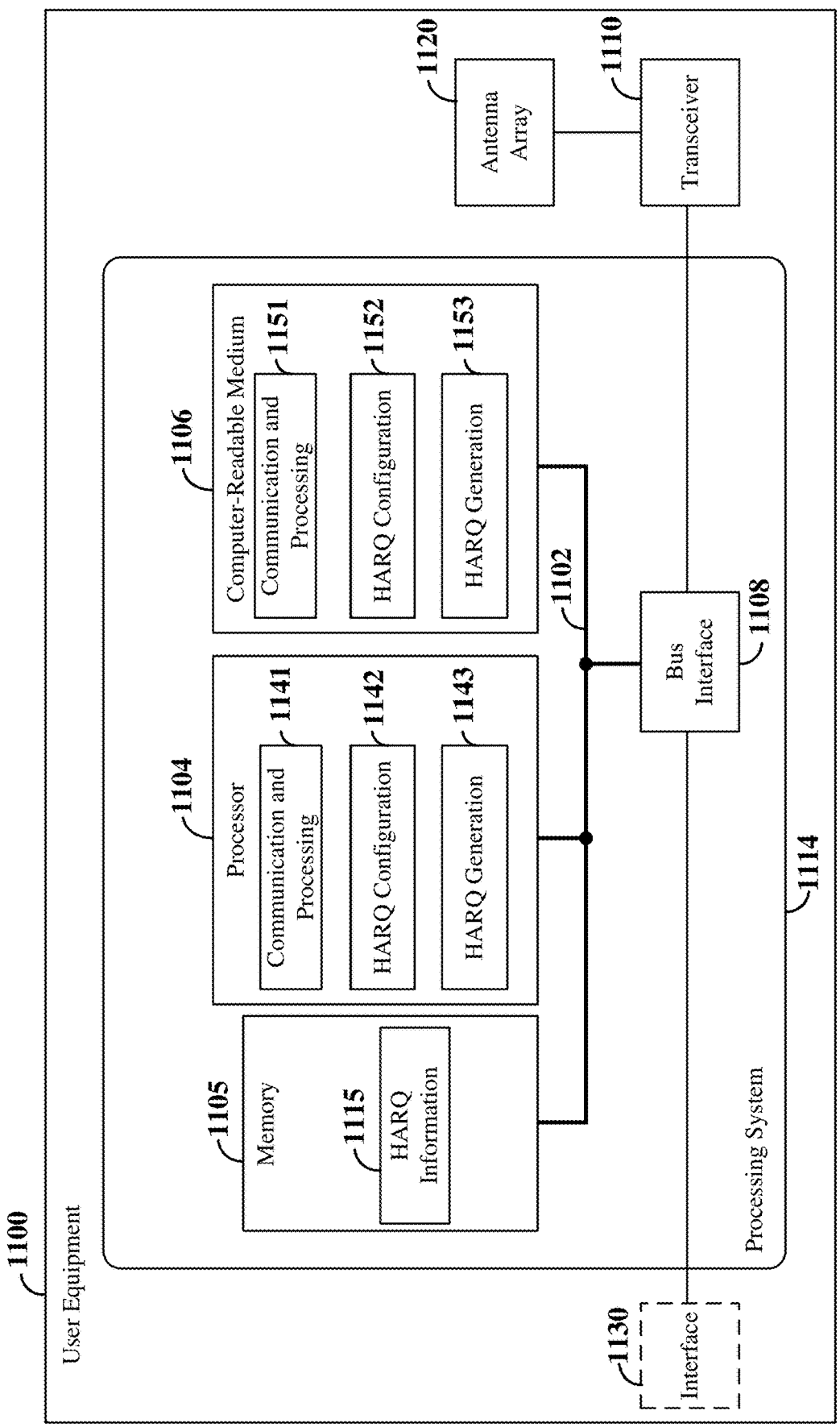
FIG. 11 is a block diagram illustrating an example of a hardware implementation for a user equipment employing a processing system according to some aspects.

FIG. 11 is a block diagram illustrating an example of a hardware implementation for a UE 1100 employing a processing system 1114. For example, the UE 1100 may be a user equipment (UE) or other device configured to wirelessly communicate with a base station, as discussed in any one or more of FIGS. 1-10. In some implementations, the UE 1100 may correspond to any of the UEs or scheduled entities shown in any one or more of FIGS. 1, 2, 9 and 10.

In accordance with various aspects of the disclosure, an element, or any portion of an element, or any combination of elements may be implemented with the processing system 1114. The processing system 1114 may include one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described herein.

The processor 1104 may in some instances be implemented via a baseband or modem chip and in other implementations, the processor 1104 may itself include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110 and an antenna array 1120, and an interface between the bus 1102 and an interface 1130. The transceiver 1110 provides a communication interface or means for communicating with various other apparatus over a wireless transmission medium. The interface 1130 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1130 may include a user interface (e.g., keypad, display, speaker, microphone, joystick). Of course, such a user interface is optional, and may be omitted in some examples, such as an IoT device.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may include HARQ information 1115 (e.g., HARQ granularity configurations) that may be used by the processor 1104 for HARQ operations as discussed herein.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1100 may be configured to perform any one or more of the operations described herein (e.g., as described above in conjunction with FIGS. 1-10 and as described below in conjunction with FIGS. 12 and 13). In some aspects of the disclosure, the processor 1104, as utilized in the UE 1100, may include circuitry configured for various functions.

The processor 1104 may include communication and processing circuitry 1141. The communication and processing circuitry 1141 may be configured to communicate with a base station, such as a gNB. The communication and processing circuitry 1141 may include one or more hardware components that provide the physical structure that performs various processes related to wireless communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. In some examples, the communication and processing circuitry 1141 may include two or more transmit/receive chains, each configured to process signals in a different RAT (or RAN) type. The communication and processing circuitry 1141 may further be configured to execute communication and processing software 1151 included on the computer-readable medium 1106 to implement one or more functions described herein.

In some examples, the communication and processing circuitry 1141 may be configured to generate and transmit a scheduling request (e.g., via UCI in a PUCCH) to the base station to receive an uplink grant for the PUSCH. The communication and processing circuitry 1141 may further be configured to generate an uplink signal and interact with the transceiver 1110 to transmit the uplink signal. The uplink signal may include, for example, a PUCCH, PUSCH, SRS, DMRS, or physical random access channel (PRACH) transmission. The communication and processing circuitry 1141 may further be configured to interact with the transceiver 1110 to monitor for a downlink signal and decode a downlink signal. The downlink signal may include, for example, a PDCCH, PDSCH, CSI-RS, or DMRS transmission.

In some implementations where the communication involves receiving information, the communication and processing circuitry 1141 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may include functionality for a means for receiving (e.g., means for receiving a downlink transmission).

In some implementations where the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., means for transmitting).

The processor 1104 may include HARQ configuration circuitry 1142 configured to perform HARQ configuration-related operations as discussed herein. The HARQ configuration circuitry 1142 may be configured to execute HARQ configuration software 1152 included on the computer-readable medium 1106 to implement one or more functions described herein.

The HARQ configuration circuitry 1142 may include functionality for a means for receiving a HARQ configuration. For example, the HARQ configuration circuitry 1142 may be configured to monitor for RRC configuration messages (e.g., on a PDSCH) transmitted by a base station to determine the HARQ feedback granularities (e.g., a two OFDM symbol sub-slot configuration and a seven-OFDM symbol sub-slot configuration) specified by the base station. Other HARQ feedback granularities may be used in other examples.

The HARQ configuration circuitry 1142 may include functionality for a means for receiving an indication. For example, the HARQ configuration circuitry 1142 may be configured to monitor and decode a PDSCH (e.g., including a MAC-CE) or a PDCCH (e.g., including a DCI) to determine whether a base station is changing the HARQ feedback granularity (e.g., from a two OFDM symbol sub-slot configuration to a seven-OFDM symbol sub-slot configuration, or vice versa). Other HARQ feedback granularities may be used in other examples.

The processor 1104 may include HARQ generation circuitry 1143 configured to perform HARQ generation-related operations as discussed herein. The HARQ generation circuitry 1143 may be configured to execute HARQ generation software 1153 included on the computer-readable medium 1106 to implement one or more functions described herein.

The HARQ generation circuitry 1143 may include functionality for a means for generating HARQ feedback. For example, the HARQ generation circuitry 1143 may be configured to perform an error check (e.g., using a cyclic redundancy check (CRC) or some other form of error check) to determine whether a PDSCH was successfully decoded and then generate a HARQ codebook (e.g., indicting an ACK or a NACK) accordingly.

The HARQ generation circuitry 1143 may include functionality for a means for transmitting HARQ feedback. For example, the HARQ generation circuitry 1143 may be configured to transmit the HARQ codebook in two OFDM symbols or seven-OFDM symbols via a PUCCH, depending on a specified HARQ feedback granularity. A different number of symbols may be used in other examples.

Figure 12:
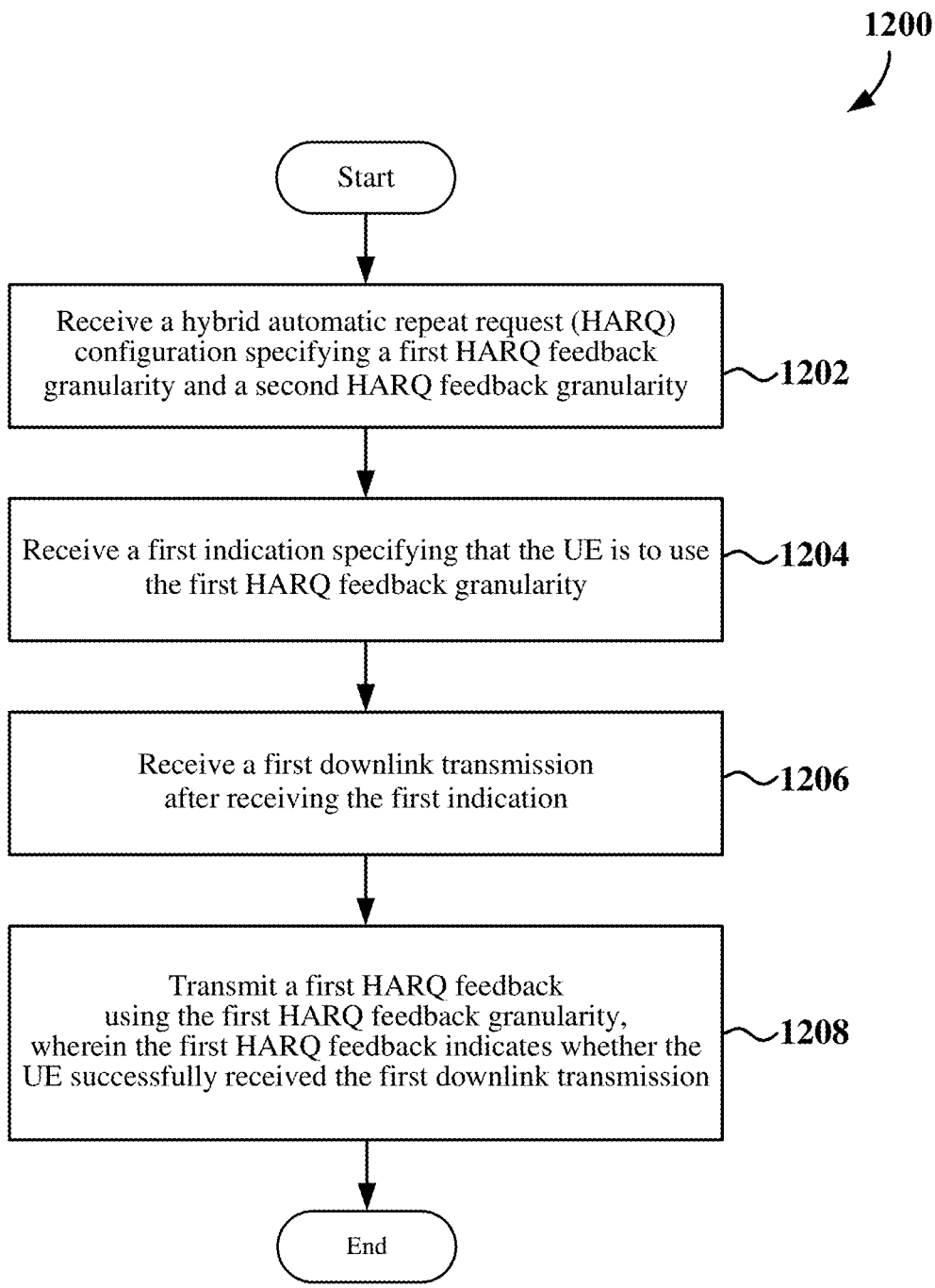
FIG. 12 is a flow chart of an example HARQ feedback method according to some aspects.

FIG. 12 is a flow chart illustrating an example wireless communication method 1200 in accordance with some aspects of the disclosure. As described below, some or all illustrated features may be omitted in a particular implementation within the scope of the present disclosure, and some illustrated features may not be required for implementation of all examples. In some examples, the wireless communication method 1200 may be carried out by the UE 1100 illustrated in FIG. 11. In some examples, the wireless communication method 1200 may be carried out by any suitable apparatus or means for carrying out the functions or algorithm described below.

At block 1202, a UE may receive a hybrid automatic repeat request (HARQ) configuration specifying a first HARQ feedback granularity and a second HARQ feedback granularity. For example, the HARQ configuration circuitry 1142 together with the communication and processing circuitry 1141 and the transceiver 1110, shown and described above in connection with FIG. 11, may provide a means to receive a hybrid automatic repeat request (HARQ) configuration specifying a first HARQ feedback granularity and a second HARQ feedback granularity.

In some examples, the first HARQ feedback granularity is a first sub-slot granularity and the second HARQ feedback granularity is a second sub-slot granularity. In some examples, the first HARQ feedback granularity is two orthogonal frequency division multiplexing (OFDM) symbols and the second HARQ feedback granularity is seven OFDM symbols. In some examples, the first HARQ feedback granularity is seven orthogonal frequency division multiplexing (OFDM) symbols and the second HARQ feedback granularity is two OFDM symbols.

At block 1204, the UE may receive a first indication specifying that the UE is to use the first HARQ feedback granularity. For example, the HARQ configuration circuitry 1142 together with the communication and processing circuitry 1141 and the transceiver 1110, shown and described above in connection with FIG. 11, may provide a means to receive a first indication specifying that the UE is to use the first HARQ feedback granularity.

In some examples, the UE may receive a medium access control-control element (MAC-CE) that includes the first indication. In some examples, the UE may receive a downlink control information (DCI) that includes the first indication and schedules the first downlink transmission. In some examples, the UE may receive a first downlink control information (DCI) that includes the first indication. In some examples, the UE may receive a second DCI that schedules the first downlink transmission.

At block 1206, the UE may receive a first downlink transmission after receiving the first indication. For example, the communication and processing circuitry 1141 and the transceiver 1110, shown and described above in connection with FIG. 11, may provide a means to receive a first downlink transmission after receiving the first indication.

At block 1208, the UE may transmit a first HARQ feedback using the first HARQ feedback granularity, wherein the first HARQ feedback indicates whether the UE successfully received the first downlink transmission. For example, the HARQ generation circuitry 1143 together with the communication and processing circuitry 1141 and the transceiver 1110, shown and described above in connection with FIG. 11, may provide a means to transmit a first HARQ feedback using the first HARQ feedback granularity.

In some examples, the UE may receive a resource configuration specifying a plurality of first uplink resources for the first HARQ feedback granularity and a plurality of second uplink resources for the second HARQ feedback granularity. In this case, the UE may transmit the first HARQ feedback on a selected resource of the plurality of first uplink resources. In some examples, the plurality of first uplink resources may include a plurality of first physical uplink control channel (PUCCH) resources, and the plurality of second uplink resources may include a plurality of second PUCCH resources.

In some examples, the UE may receive a second indication specifying that the UE is to use the second HARQ feedback granularity, receive a second downlink transmission after receiving the second indication, generate a second HARQ feedback indicating whether the UE successfully received the second downlink transmission, and transmit the second HARQ feedback using the second HARQ feedback granularity. In some examples, the UE may maintain a first HARQ feedback codebook for the first HARQ feedback granularity and maintain a second HARQ feedback codebook for the second HARQ feedback granularity. In this case, the second HARQ feedback codebook may be different from the first HARQ feedback codebook.

In some examples, the UE may receive a first downlink assignment index (DAI) via a first physical downlink control channel (PDCCH) that schedules the first downlink transmission, and receive a second DAI different from the first DAI via a second PDCCH that schedules the second downlink transmission. In some examples, the UE may transmit the first HARQ feedback based on the first DAI and transmit the second HARQ feedback based on the second DAI.

In some examples, the UE may generate second HARQ feedback indicating that the UE successfully received a MAC-CE, and transmit the second HARQ feedback at a first time. In some examples, the UE may switch to use of the first HARQ feedback granularity for subsequent HARQ transmissions by the UE at a second time that follows the first time. In some examples, the switch is from prior use of the second HARQ feedback granularity by the UE. In some examples, the second time occurs within a defined period of time after the first time. In some examples, the defined period of time is three milliseconds. In some examples, the UE may abstain from transmitting HARQ transmissions between the first time and the second time.

In some examples, the UE may receive a second downlink transmission, generate a second HARQ feedback indicating whether the UE successfully received the second downlink transmission, generate a first HARQ codebook for the first HARQ feedback, generate a second HARQ codebook for the second HARQ feedback, determine that a first uplink resource for the first HARQ feedback and a second uplink resource for the second HARQ feedback at least partially overlap, and merge the first HARQ codebook and the second HARQ codebook into a merged codebook after determining that the first uplink resource for the first HARQ feedback and the second uplink resource for the second HARQ feedback at least partially overlap. In this case, to transmit the HARQ feedback, the UE may transmit the merged codebook.

In some examples, the UE may determine that the first HARQ feedback is scheduled for an earlier transmission than the second HARQ feedback. In this case, the UE may merge the second HARQ codebook into the first HARQ codebook as a result of determining that the first HARQ feedback is scheduled for the earlier transmission than the second HARQ feedback.

In some examples, the UE may determine that the first uplink resource has more orthogonal frequency division multiplexing (OFDM) symbols than the second uplink resource. In this case, the UE may transmit the merged codebook via the first uplink resource as a result of determining that the first uplink resource has more OFDM symbols than the second uplink resource.

In some examples, the UE may determine that a first downlink control information (DCI) for the first downlink transmission was received by the UE after a second DCI for the second downlink transmission. In this case, the UE may transmit the merged codebook according to a HARQ timeline for the first downlink transmission as a result of determining that the first DCI for the first downlink transmission was received by the UE after the second DCI for the second downlink transmission.

Figure 13:
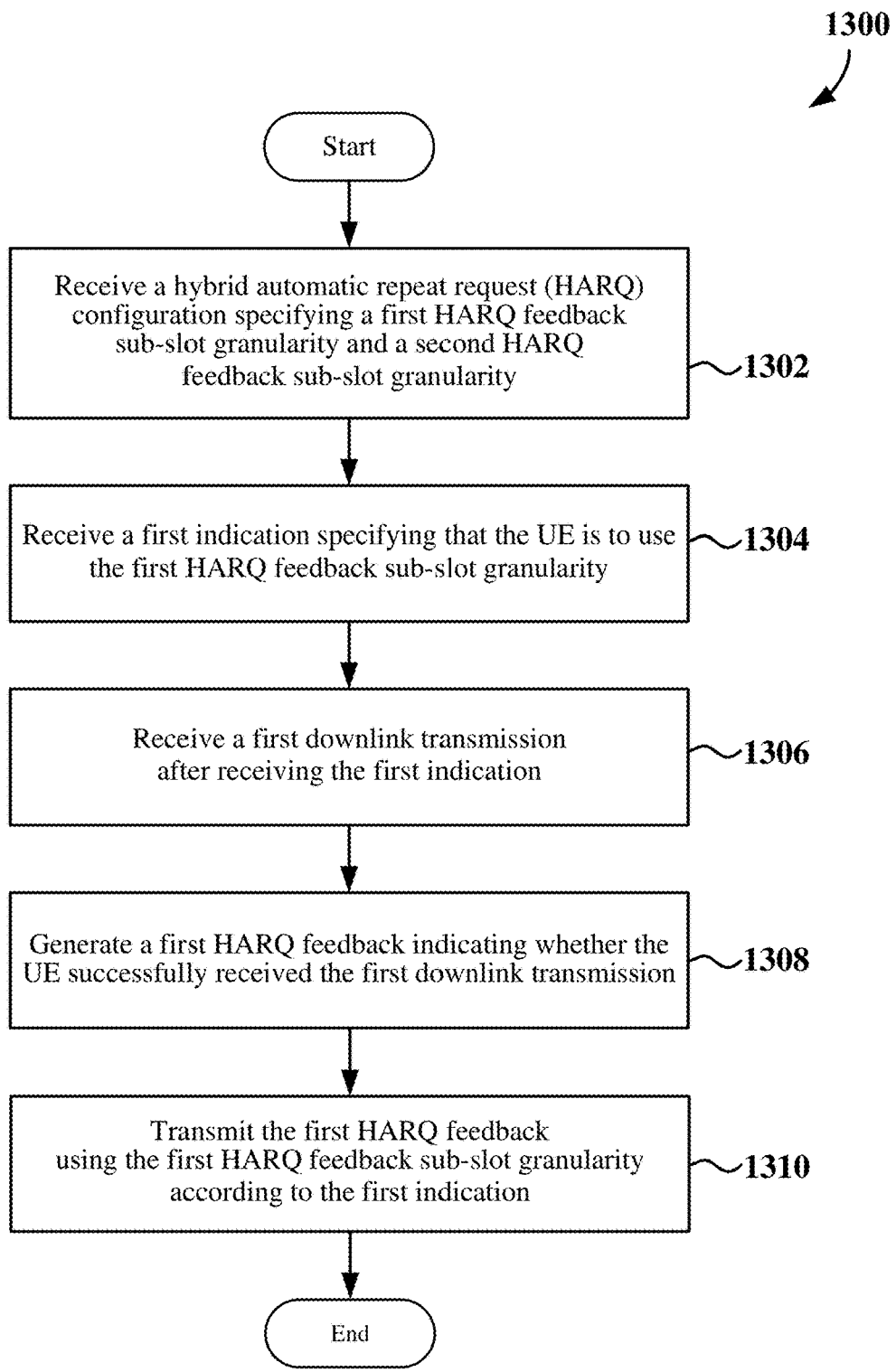
FIG. 13 is a flow chart of another example HARQ feedback method according to some aspects.

FIG. 13 is a flow chart illustrating an example wireless communication method 1300 in accordance with some aspects of the disclosure. As described below, some or all illustrated features may be omitted in a particular implementation within the scope of the present disclosure, and some illustrated features may not be required for implementation of all examples. In some examples, the wireless communication method 1300 may be carried out by the UE 1100 illustrated in FIG. 11. In some examples, the wireless communication method 1300 may be carried out by any suitable apparatus or means for carrying out the functions or algorithm described below.

At block 1302, a UE may receive a hybrid automatic repeat request (HARQ) configuration specifying a first HARQ feedback sub-slot granularity and a second HARQ feedback sub-slot granularity. For example, the HARQ configuration circuitry 1142 together with the communication and processing circuitry 1141 and the transceiver 1110, shown and described above in connection with FIG. 11, may provide a means to receive a hybrid automatic repeat request (HARQ) configuration specifying a first HARQ feedback sub-slot granularity and a second HARQ feedback sub-slot granularity.

In some examples, the first HARQ feedback sub-slot granularity is two orthogonal frequency division multiplexing (OFDM) symbols and the second HARQ feedback sub-slot granularity is seven OFDM symbols. In some examples, the first HARQ feedback sub-slot granularity is seven orthogonal frequency division multiplexing (OFDM) symbols and the second HARQ feedback sub-slot granularity is two OFDM symbols.

At block 1304, the UE may receive a first indication specifying that the UE is to use the first HARQ feedback sub-slot granularity. For example, the HARQ configuration circuitry 1142 together with the communication and processing circuitry 1141 and the transceiver 1110, shown and described above in connection with FIG. 11, may provide a means to receive a first indication specifying that the UE is to use the first HARQ feedback sub-slot granularity.

In some examples, the UE may receive a medium access control-control element (MAC-CE) that includes the first indication, a downlink control information (DCI) that includes the first indication and schedules the first downlink transmission, or a first downlink control information (DCI) that includes the first indication. In some examples, the UE may receive a second DCI that schedules the first downlink transmission.

At block 1306, the UE may receive a first downlink transmission after receiving the first indication. For example, the communication and processing circuitry 1141 and the transceiver 1110, shown and described above in connection with FIG. 11, may provide a means to receive a first downlink transmission after receiving the first indication.

At block 1308, the UE may generate a first HARQ feedback indicating whether the UE successfully received the first downlink transmission. For example, the HARQ generation circuitry 1143, shown and described above in connection with FIG. 11, may provide a means to generate a first HARQ feedback indicating whether the UE successfully received the first downlink transmission.

At block 1310, the UE may transmit the first HARQ feedback using the first HARQ feedback sub-slot granularity according to the first indication. For example, the HARQ generation circuitry 1143 together with the communication and processing circuitry 1141 and the transceiver 1110, shown and described above in connection with FIG. 11, may provide a means to transmit the first HARQ feedback using the first HARQ feedback sub-slot granularity according to the first indication.

In some examples, the UE may receive a resource configuration specifying a plurality of first uplink resources for the first HARQ feedback sub-slot granularity and a plurality of second uplink resources for the second HARQ feedback sub-slot granularity. In this case, the UE may transmit the first HARQ feedback on a selected resource of the plurality of first uplink resources. In some examples, the plurality of first uplink resources may include a plurality of first physical uplink control channel (PUCCH) resources, and the plurality of second uplink resources may include a plurality of second PUCCH resources.

In some examples, the UE may receive a second indication specifying that the UE is to use the second HARQ feedback sub-slot granularity, receive a second downlink transmission after receiving the second indication, generate a second HARQ feedback indicating whether the UE successfully received the second downlink transmission, and transmit the second HARQ feedback using the second HARQ feedback sub-slot granularity according to the second indication. In some examples, the UE may maintain a first HARQ feedback codebook for the first HARQ feedback sub-slot granularity and maintain a second HARQ feedback codebook for the second HARQ feedback sub-slot granularity. In this case, the second HARQ feedback codebook may be different from the first HARQ feedback codebook.

In some examples, the UE may receive a first downlink assignment index (DAI) via a first physical downlink control channel (PDCCH) that schedules the first downlink transmission, and receive a second DAI different from the first DAI via a second PDCCH that schedules the second downlink transmission. In some examples, the UE may transmit the first HARQ feedback based on the first DAI and transmit the second HARQ feedback may include transmitting the second HARQ feedback based on the second DAI.

In some examples, the UE may generate second HARQ feedback indicating that the UE successfully received the MAC-CE, and transmit the second HARQ feedback at a first time. In some examples, the UE may switch to use of the first HARQ feedback sub-slot granularity for subsequent HARQ transmissions by the UE at a second time that follows the first time. In some examples, the switch is from prior use of the second HARQ feedback sub-slot granularity by the UE. In some examples, the second time occurs within a defined period of time after the first time. In some examples, the defined period of time is three milliseconds. In some examples, the UE may abstain from transmitting HARQ transmissions between the first time and the second time.

In some examples, the UE may receive a second downlink transmission, generate a second HARQ feedback indicating whether the UE successfully received the second downlink transmission, generate a first HARQ codebook for the first HARQ feedback, generate a second HARQ codebook for the second HARQ feedback, determine that a first uplink resource for the first HARQ feedback and a second uplink resource for the second HARQ feedback at least partially overlap, and merge the first HARQ codebook and the second HARQ codebook into a merged codebook after determining that the first uplink resource for the first HARQ feedback and the second uplink resource for the second HARQ feedback at least partially overlap. In this case, the UE may transmit the merged codebook.

In some examples, the UE may determine that the first HARQ feedback is scheduled for an earlier transmission than the second HARQ feedback. In this case, the UE may merge the second HARQ codebook into the first HARQ codebook as a result of determining that the first HARQ feedback is scheduled for the earlier transmission than the second HARQ feedback.

In some examples, the UE may determine that the first uplink resource has more orthogonal frequency division multiplexing (OFDM) symbols than the second uplink resource. In this case, the UE may transmit the merged codebook via the first uplink resource as a result of determining that the first uplink resource has more OFDM symbols than the second uplink resource.

In some examples, the UE may determine that a first downlink control information (DCI) for the first downlink transmission was received by the UE after a second DCI for the second downlink transmission. In this case, the UE may transmit the merged codebook according to a HARQ timeline for the first downlink transmission as a result of determining that the first DCI for the first downlink transmission was received by the UE after the second DCI for the second downlink transmission.

In one configuration, the UE 1100 includes means for receiving a hybrid automatic repeat request (HARQ) configuration specifying a first HARQ feedback sub-slot granularity and a second HARQ feedback sub-slot granularity, means for receiving a first indication specifying that the user equipment is to use the first HARQ feedback sub-slot granularity, means for receiving a first downlink transmission after receiving the first indication, and means for transmitting a first HARQ feedback using the first HARQ feedback sub-slot granularity, wherein the first HARQ feedback indicates whether the user equipment successfully received the first downlink transmission. In one aspect, the aforementioned means may be the processor 1104 shown in FIG. 11 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one or more of FIGS. 1, 2, 9, 10, and 11, and utilizing, for example, the methods and/or algorithms described herein in relation to FIGS. 12 and 13.

Figure 14:
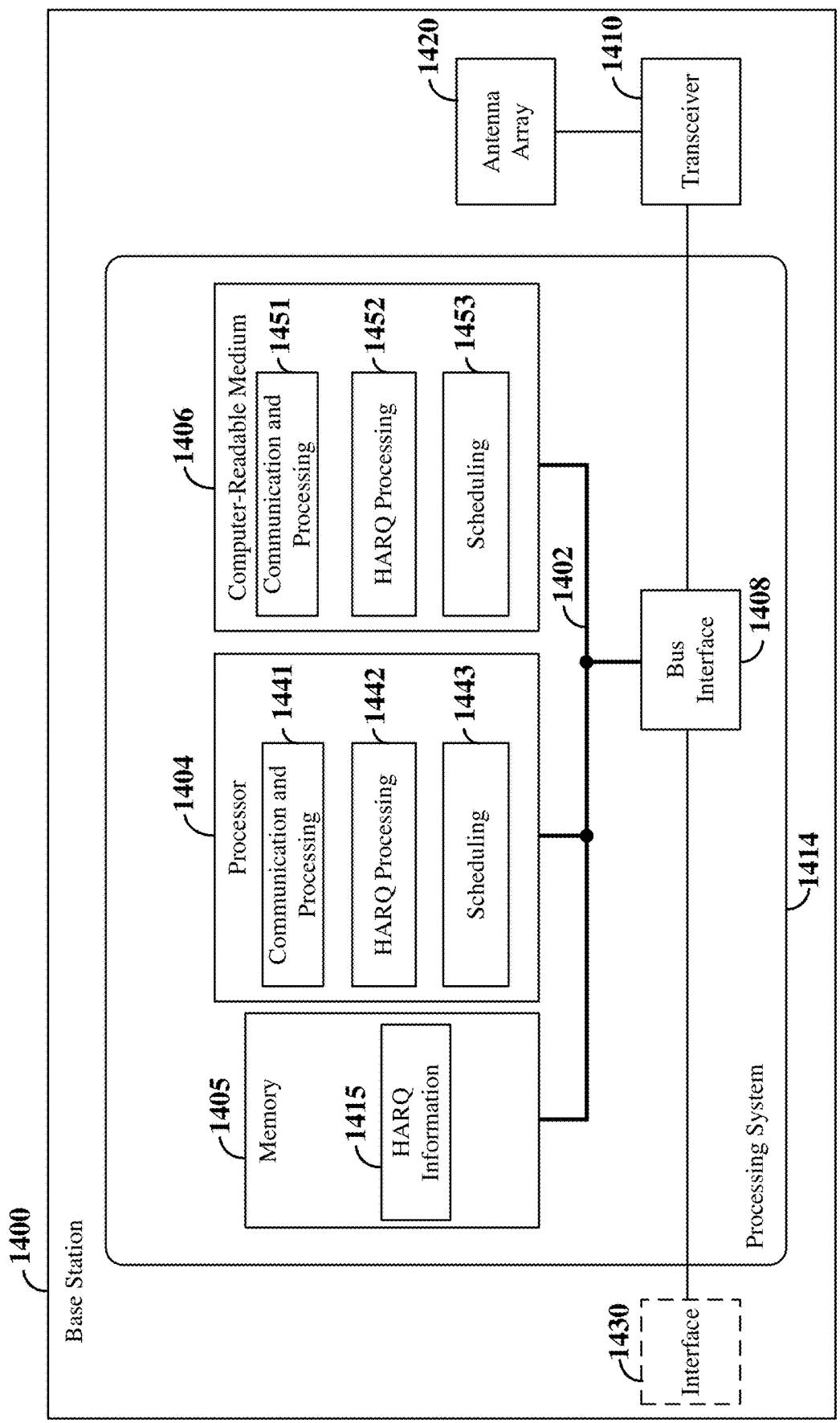
FIG. 14 is a block diagram illustrating an example of a hardware implementation for a base station employing a processing system according to some aspects.

FIG. 14 is a conceptual diagram illustrating an example of a hardware implementation for base station (BS) 1400 employing a processing system 1414. In some implementations, the BS 1400 may correspond to any of the BSs (e.g., gNBs,) or scheduling entities shown in any one or more of FIGS. 1, 2, 9 and 10.

In accordance with various aspects of the disclosure, an element, or any portion of an element, or any combination of elements may be implemented with the processing system 1414. The processing system may include one or more processors 1404. The processing system 1414 may be substantially the same as the processing system 1114 illustrated in FIG. 11, including a bus interface 1408, a bus 1402, memory 1405, a processor 1404, and a computer-readable medium 1406. For example, the memory 1405 may include HARQ information 1415 (e.g., HARQ granularity configurations) that may be used by the processor 1404 for HARQ operations as discussed herein. Furthermore, the BS 1400 may include an interface 1430 (e.g., a network interface) that provides a means for communicating with at least one other apparatus within a core network and with at least one radio access network.

The BS 1400 may be configured to perform any one or more of the operations described herein (e.g., as described above in conjunction with FIGS. 1-10 and as described below in conjunction with FIGS. 15 and 16). In some aspects of the disclosure, the processor 1404, as utilized in the BS 1400, may include circuitry configured for various functions.

The processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple UEs.

The processor 1404 may be configured to schedule resources for the transmission of a downlink signal. The downlink signal may include, for example, a PDCCH, a PDSCH, a CSI-RS, or a DMRS. The processor 1404 may further be configured to schedule resources that may be utilized by the UE to transmit an uplink signal. The uplink signal may include, for example, a PUCCH, a PUSCH, an SRS, a DMRS, or a PRACH.

In some aspects of the disclosure, the processor 1404 may include communication and processing circuitry 1441. The communication and processing circuitry 1444 may be configured to communicate with a UE. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein. The communication and processing circuitry 1441 may further be configured to interact with the transceiver 1410 to encode and transmit a downlink signal. The communication and processing circuitry 1441 may further be configured to interact with the transceiver 1410 to monitor for and decode an uplink signal.

In some implementations where the communication involves receiving information, the communication and processing circuitry 1441 may obtain information from a component of the BS 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., means for transmitting).

The processor 1404 may include HARQ processing circuitry 1442 configured to perform HARQ configuration-related operations as discussed herein. The HARQ processing circuitry 1442 may be configured to execute HARQ configuration software 1452 included on the computer-readable medium 1406 to implement one or more functions described herein.

The HARQ processing circuitry 1442 may include functionality for a means for generating a HARQ configuration. For example, the HARQ processing circuitry 1442 may be configured to select the HARQ feedback granularities (e.g., a two OFDM symbol sub-slot configuration and a seven-OFDM symbol sub-slot configuration) to be used by one or more UEs served by the base station. In some examples, the HARQ feedback granularities may be selected based on the downlink traffic to be transmitted by the base station. Other HARQ feedback granularities may be used in other examples.

The HARQ processing circuitry 1442 may include functionality for a means for transmitting a HARQ configuration. For example, the HARQ processing circuitry 1442 may be configured to transmit an RRC configuration message (e.g., on an allocated PDSCH) that includes the HARQ configuration.

The HARQ processing circuitry 1442 may include functionality for a means for transmitting an indication. For example, the HARQ processing circuitry 1442 may be configured to elect to change the HARQ feedback granularity currently being used by the UE (e.g., from a two OFDM symbol sub-slot configuration to a seven-OFDM symbol sub-slot configuration, or vice versa) due a change in the type of PDSCH traffic to be transmitted by the base station. In addition, the HARQ processing circuitry 1442 may be configured to transmit a corresponding indication via a PDSCH (e.g., including a MAC-CE), via a PDCCH (e.g., including a DCI), or via some other suitable signaling.

The HARQ processing circuitry 1442 may include functionality for a means for receiving a HARQ feedback transmission. For example, the HARQ processing circuitry 1442 may be configured to receive and decode HARQ feedback (e.g., a HARQ codebook in two OFDM symbols or seven-OFDM symbols, depending on the specified HARQ feedback granularity) via a PUCCH or via some other suitable channel. A different number of symbols may be used in other examples.

The processor 1404 may include scheduling circuitry 1443 configured to perform scheduling-related operations as discussed herein (e.g., communicating scheduling of a time slot for a user). The scheduling circuitry 1443 may be configured to execute scheduling software 1453 included on the computer-readable medium 1406 to implement one or more functions described herein.

The scheduling circuitry 1443 may include functionality for a means for generating a DCI. For example, the scheduling circuitry 1443 may be configured to schedule a downlink transmission to a UE and generate a DCI indicating the resources that are allocated for the downlink transmission.

The scheduling circuitry 1443 may include functionality for a means for transmitting a DCI. For example, the scheduling circuitry 1443 may be configured to transmit the DCI on a PDCCH allocated for a UE.

The scheduling circuitry 1443 may include functionality for a means for transmitting a downlink transmission. For example, the scheduling circuitry 1443 may be configured to schedule a downlink transmission to a UE and transmit the downlink transmission via a PDSCH or via some other suitable channel.

Figure 15:
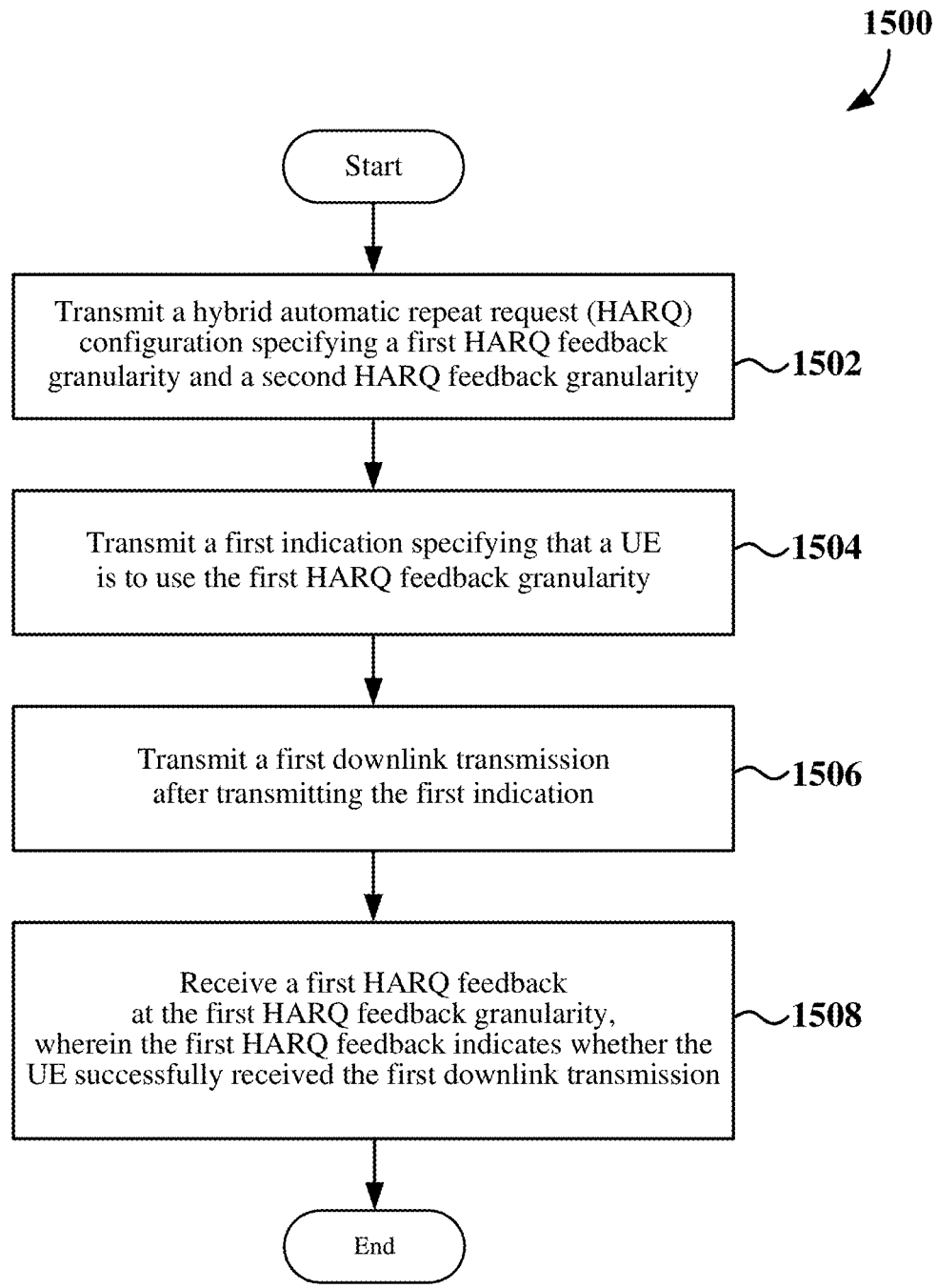
FIG. 15 is a flow chart of an example method for configuring HARQ feedback granularities according to some aspects.

FIG. 15 is a flow chart illustrating an example wireless communication method 1500 in accordance with some aspects of the disclosure. As described below, some or all illustrated features may be omitted in a particular implementation within the scope of the present disclosure, and some illustrated features may not be required for implementation of all examples. In some examples, the wireless communication method 1500 may be carried out by the BS 1400 illustrated in FIG. 14. In some examples, the wireless communication method 1500 may be carried out by any suitable apparatus or means for carrying out the functions or algorithm described below.

At block 1502, a BS may transmit a hybrid automatic repeat request (HARQ) configuration specifying a first HARQ feedback granularity and a second HARQ feedback granularity. For example, the HARQ processing circuitry 1442, shown and described above in connection with FIG. 14, may provide a means to transmit a hybrid automatic repeat request (HARQ) configuration specifying a first HARQ feedback granularity and a second HARQ feedback granularity In some examples, the first HARQ feedback granularity is a first sub-slot granularity and the second HARQ feedback granularity is a second sub-slot granularity. In some examples, the first HARQ feedback granularity is two orthogonal frequency division multiplexing (OFDM) symbols and the second HARQ feedback granularity is seven OFDM symbols. In some examples, the first HARQ feedback granularity is seven orthogonal frequency division multiplexing (OFDM) symbols and the second HARQ feedback granularity is two OFDM symbols.

At block 1504, the BS may transmit a first indication specifying that a user equipment (UE) is to use the first HARQ feedback granularity. For example, the HARQ processing circuitry 1442 together with the communication and processing circuitry 1441 and the transceiver 1410, shown and described above in connection with FIG. 14, may provide a means to transmit a first indication specifying that a user equipment (UE) is to use the first HARQ feedback granularity.

In some examples, the BS may generate a medium access control-control element (MAC-CE) that includes the first indication and transmit the MAC-CE. In some examples, the BS may transmit a physical downlink shared channel (PUSCH) that includes the MAC-CE.

In some examples, the BS may generate a first downlink control information (DCI) that includes the first indication and schedules the first downlink transmission, and then transmit the first DCI.

In some examples, the BS may generate a first downlink control information (DCI) that includes the first indication and then transmit the first DCI. In some examples, the BS may generate a second DCI that schedules the first downlink transmission and then transmit the second DCI.

At block 1506, the BS may transmit a first downlink transmission after transmitting the first indication. For example, the scheduling circuitry 1443 together with the communication and processing circuitry 1441 and the transceiver 1410, shown and described above in connection with FIG. 14, may provide a means to transmit a first downlink transmission after transmitting the first indication.

At block 1508, the BS may receive a first HARQ feedback at the first HARQ feedback granularity, wherein the first HARQ feedback indicates whether the UE successfully received the first downlink transmission. For example, the HARQ processing circuitry 1442 together with the communication and processing circuitry 1441 and the transceiver 1410, shown and described above in connection with FIG. 14, may provide a means to receive a first HARQ feedback at the first HARQ feedback granularity.

In some examples, the BS may generate a resource configuration specifying a plurality of first uplink resources for the first HARQ feedback granularity and a plurality of second uplink resources for the second HARQ feedback granularity, and then transmit the resource configuration. In this case, the BS may receive the first HARQ feedback on a selected resource of the plurality of first uplink resources. In some examples, the plurality of first uplink resources may include a plurality of first physical uplink control channel (PUCCH) resources and the plurality of second uplink resources may include a plurality of second PUCCH resources.

In some examples, the BS may transmit a second indication specifying that a UE is to use the second HARQ feedback granularity, transmit a second downlink transmission after transmitting the second indication, and receive a second HARQ feedback at the second HARQ feedback granularity, the second HARQ feedback indicating whether the UE successfully received the second downlink transmission. In some examples, the BS may transmit a first downlink assignment index (DAI) via a first physical downlink control channel (PDCCH) that schedules the first downlink transmission, and transmit a second DAI different from the first DAI via a second PDCCH that schedules the second downlink transmission.

In some examples, the BS may receive second HARQ feedback indicating that the UE successfully received the MAC-CE, and abstain from scheduling any downlink transmissions to the UE for a defined period of time that commences after receiving the second HARQ feedback. In some examples, the BS may switch to use of the first HARQ feedback granularity for receiving subsequent HARQ transmissions from the UE after the defined period of time. In some examples, the switch is from prior use of the second HARQ feedback granularity by the UE. In some examples, the defined period of time is three milliseconds.

In some examples, the BS may transmit a second downlink transmission, and determine that a first uplink resource for the first HARQ feedback and a second uplink resource for a second HARQ feedback for the second downlink transmission at least partially overlap. In this case, the BS may receive a merged codebook based on a first HARQ codebook for the first HARQ feedback and a second HARQ codebook for the second HARQ feedback. In some examples, the BS may process the merged codebook to extract the first HARQ feedback and the second HARQ feedback.

In some examples, to receive the merged codebook, the BS may determine that the first HARQ feedback is scheduled for an earlier transmission than the second HARQ feedback, determine that the second HARQ codebook is merged into the first HARQ codebook as a result of determining that the first HARQ feedback is scheduled for the earlier transmission than the second HARQ feedback, determine a size of the merged codebook as a result of determining that the second HARQ codebook is merged into the first HARQ codebook, and monitor for the merged codebook of the determined size on at least a portion of the first uplink resource for the first HARQ feedback.

In some examples, to receive the merged codebook, the BS may determine that the first uplink resource for the first HARQ feedback is larger than the second uplink resource for the second HARQ feedback, determine that the merged codebook is transmitted via at least a portion of the first uplink resource for the first HARQ feedback as a result of determining that the first uplink resource for the first HARQ feedback is larger than the second uplink resource for the second HARQ feedback and monitor for the merged codebook on the at least a portion of the first uplink resource for the first HARQ feedback.

In some examples, to receive the merged codebook, the BS may determine that a first downlink control information (DCI) for the first downlink transmission was received by the UE after a second DCI for the second downlink transmission, determine that the merged codebook is transmitted according to a HARQ timeline for the first downlink transmission as a result of determining that the first DCI for the first downlink transmission was received by the UE after the second DCI for the second downlink transmission, and monitor for the merged codebook according to the HARQ timeline for the first downlink transmission.

Figure 16:
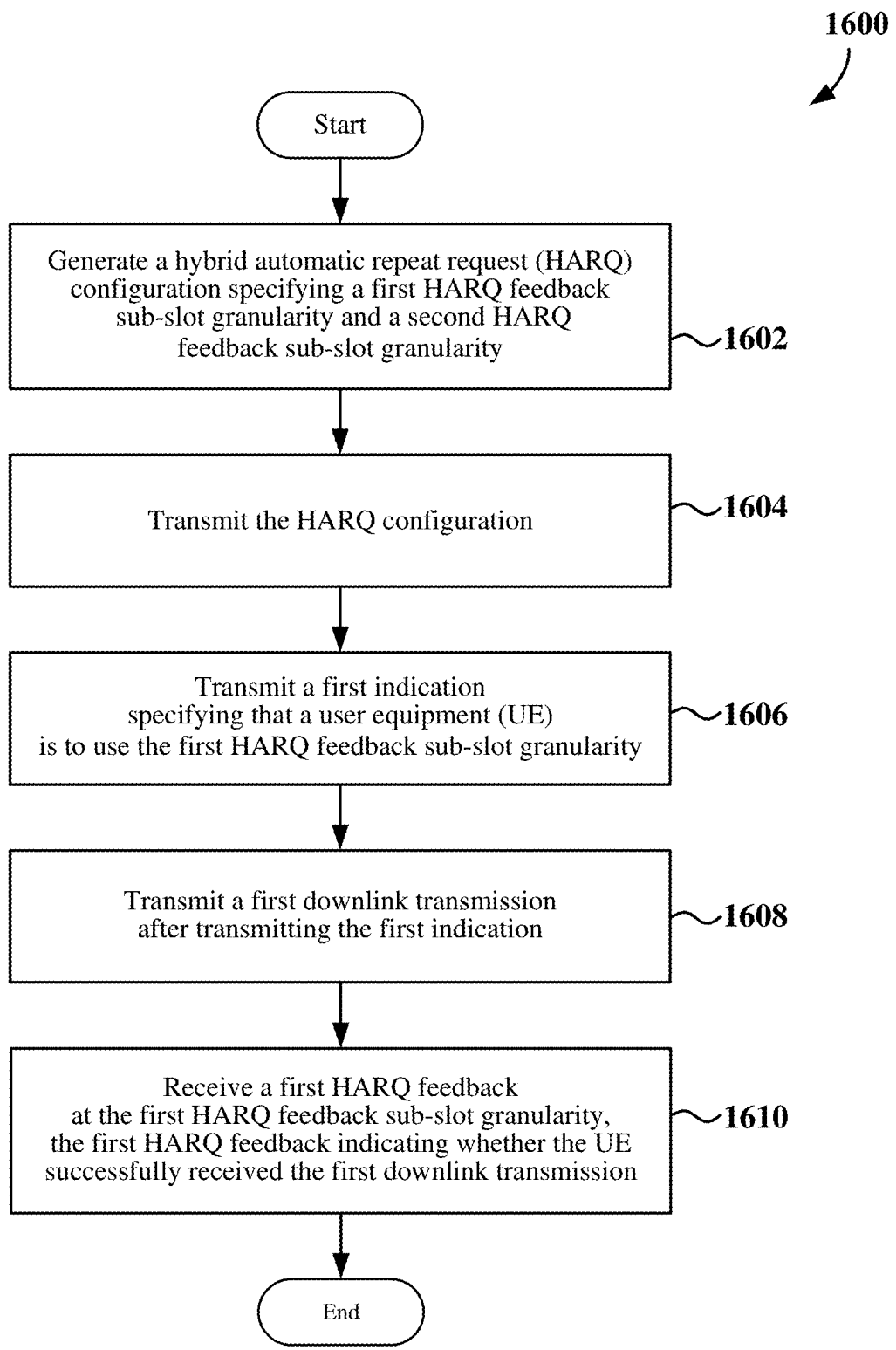
FIG. 16 is a flow chart of another example method for configuring HARQ feedback granularities according to some aspects.

FIG. 16 is a flow chart illustrating an example wireless communication method 1600 in accordance with some aspects of the disclosure. As described below, some or all illustrated features may be omitted in a particular implementation within the scope of the present disclosure, and some illustrated features may not be required for implementation of all examples. In some examples, the wireless communication method 1600 may be carried out by the BS 1400 illustrated in FIG. 14. In some examples, the wireless communication method 1600 may be carried out by any suitable apparatus or means for carrying out the functions or algorithm described below.

At block 1602, a BS may generate a hybrid automatic repeat request (HARQ) configuration specifying a first HARQ feedback sub-slot granularity and a second HARQ feedback sub-slot granularity. For example, the HARQ processing circuitry 1442, shown and described above in connection with FIG. 14, may provide a means to generate a hybrid automatic repeat request (HARQ) configuration specifying a first HARQ feedback sub-slot granularity and a second HARQ feedback sub-slot granularity In some examples, the first HARQ feedback sub-slot granularity is two orthogonal frequency division multiplexing (OFDM) symbols and the second HARQ feedback sub-slot granularity is seven OFDM symbols. In some examples, the first HARQ feedback sub-slot granularity is seven orthogonal frequency division multiplexing (OFDM) symbols and the second HARQ feedback sub-slot granularity is two OFDM symbols.

At block 1604, the BS may transmit the HARQ configuration. For example, the HARQ processing circuitry 1442 together with the communication and processing circuitry 1441 and the transceiver 1410, shown and described above in connection with FIG. 14, may provide a means to transmit the HARQ configuration.

At block 1606, the BS may transmit a first indication specifying that a user equipment (UE) is to use the first HARQ feedback sub-slot granularity. For example, the HARQ processing circuitry 1442 together with the communication and processing circuitry 1441 and the transceiver 1410, shown and described above in connection with FIG. 14, may provide a means to transmit a first indication specifying that a user equipment (UE) is to use the first HARQ feedback sub-slot granularity.

In some examples, the BS may generate a medium access control-control element (MAC-CE) that includes the first indication and then transmit the MAC-CE. In some examples, the BS may transmit a physical downlink shared channel (PUSCH) that includes the MAC-CE.

In some examples, the BS may generate a first downlink control information (DCI) that includes the first indication and schedules the first downlink transmission, and then transmit the first DCI.

In some examples, the BS may generate a first downlink control information (DCI) that includes the first indication and then transmit the first DCI. In some examples, the BS may generate a second DCI that schedules the first downlink transmission and then transmit the second DCI.

At block 1608, the BS may transmit a first downlink transmission after transmitting the first indication. For example, the scheduling circuitry 1443 together with the communication and processing circuitry 1441 and the transceiver 1410, shown and described above in connection with FIG. 14, may provide a means to transmit a first downlink transmission after transmitting the first indication.

At block 1610, the BS may receive a first HARQ feedback at the first HARQ feedback sub-slot granularity, the first HARQ feedback indicating whether the UE successfully received the first downlink transmission. For example, the HARQ processing circuitry 1442 together with the communication and processing circuitry 1441 and the transceiver 1410, shown and described above in connection with FIG. 14, may provide a means to receive a first HARQ feedback at the first HARQ feedback sub-slot granularity.

In some examples, the BS may generate a resource configuration specifying a plurality of first uplink resources for the first HARQ feedback sub-slot granularity and a plurality of second uplink resources for the second HARQ feedback sub-slot granularity, and transmit the resource configuration. In this case, the BS may receive the first HARQ feedback on a selected resource of the plurality of first uplink resources. In some examples, the plurality of first uplink resources may include a plurality of first physical uplink control channel (PUCCH) resources and the plurality of second uplink resources may include a plurality of second PUCCH resources.

In some examples, the BS may transmit a second indication specifying that a user equipment (UE) is to use the second HARQ feedback sub-slot granularity, transmit a second downlink transmission after transmitting the second indication, and receive a second HARQ feedback at the second HARQ feedback sub-slot granularity, the second HARQ feedback indicating whether the UE successfully received the second downlink transmission. In some examples, the BS may transmit a first downlink assignment index (DAI) via a first physical downlink control channel (PDCCH) that schedules the first downlink transmission, and transmit a second DAI different from the first DAI via a second PDCCH that schedules the second downlink transmission.

In some examples, the BS may receive second HARQ feedback indicating that the UE successfully received the MAC-CE, and abstain from scheduling any downlink transmissions to the UE for a defined period of time that commences after receiving the second HARQ feedback. In some examples, the BS may switch to use of the first HARQ feedback sub-slot granularity for receiving subsequent HARQ transmissions from the UE after the defined period of time. In some examples, the switch is from prior use of the second HARQ feedback sub-slot granularity by the UE. In some examples, the defined period of time is three milliseconds.

In some examples, the BS may transmit a second downlink transmission, and determine that a first uplink resource for the first HARQ feedback and a second uplink resource for a second HARQ feedback for the second downlink transmission at least partially overlap. In this case, the BS may receive a merged codebook based on a first HARQ codebook for the first HARQ feedback and a second HARQ codebook for the second HARQ feedback. In some examples, the BS may process the merged codebook to extract the first HARQ feedback and the second HARQ feedback.

In some examples, the BS may determine that the first HARQ feedback is scheduled for an earlier transmission than the second HARQ feedback, determine that the second HARQ codebook is merged into the first HARQ codebook as a result of determining that the first HARQ feedback is scheduled for the earlier transmission than the second HARQ feedback, determine a size of the merged codebook as a result of determining that the second HARQ codebook is merged into the first HARQ codebook, and monitor for the merged codebook of the determined size on at least a portion of the first uplink resource for the first HARQ feedback.

In some examples, the BS may determine that the first uplink resource for the first HARQ feedback is larger than the second uplink resource for the second HARQ feedback, determine that the merged codebook is transmitted via at least a portion of the first uplink resource for the first HARQ feedback as a result of determining that the first uplink resource for the first HARQ feedback is larger than the second uplink resource for the second HARQ feedback and monitor for the merged codebook on the at least a portion of the first uplink resource for the first HARQ feedback.

In some examples, the BS may determine that a first downlink control information (DCI) for the first downlink transmission was received by the UE after a second DCI for the second downlink transmission, determine that the merged codebook is transmitted according to a HARQ timeline for the first downlink transmission as a result of determining that the first DCI for the first downlink transmission was received by the UE after the second DCI for the second downlink transmission, and monitor for the merged codebook according to the HARQ timeline for the first downlink transmission.

In one configuration, the BS 1400 includes means for transmitting a hybrid automatic repeat request (HARQ) configuration specifying a first HARQ feedback sub-slot granularity and a second HARQ feedback sub-slot granularity, means for transmitting a first indication specifying that a user equipment is to use the first HARQ feedback sub-slot granularity, means for transmitting a first downlink transmission after transmitting the first indication, and means for receiving a first HARQ feedback at the first HARQ feedback sub-slot granularity, wherein the first HARQ feedback indicates whether the user equipment successfully received the first downlink transmission. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS.

1, 2, 9, 10, and 14, and utilizing, for example, the methods and/or algorithms described herein in relation to FIGS. 15 and 16.

The methods shown in FIGS. 12, 13, 15, and 16 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving a hybrid automatic repeat request (HARQ) configuration specifying a first HARQ feedback granularity and a second HARQ feedback granularity; receiving a first indication specifying that the user equipment is to use the first HARQ feedback granularity; receiving a first downlink transmission after receiving the first indication; and transmitting a first HARQ feedback using the first HARQ feedback granularity, wherein the first HARQ feedback indicates whether the user equipment successfully received the first downlink transmission.

Aspect 2: The method of aspect 1, wherein: the first HARQ feedback granularity is a first sub-slot granularity; and the second HARQ feedback granularity is a second sub-slot granularity.

Aspect 3: The method of aspect 1 or 2, wherein: the first HARQ feedback granularity is two orthogonal frequency division multiplexing (OFDM) symbols and the second HARQ feedback granularity is seven OFDM symbols; or the first HARQ feedback granularity is seven OFDM symbols and the second HARQ feedback granularity is two OFDM symbols.

Aspect 4: The method of any of aspects 1 through 3, further comprising: receiving a resource configuration specifying a plurality of first uplink resources for the first HARQ feedback granularity and a plurality of second uplink resources for the second HARQ feedback granularity; wherein transmitting the first HARQ feedback comprises transmitting the first HARQ feedback on a selected resource of the plurality of first uplink resources.

Aspect 5: The method of any of aspects 1 through 4, further comprising: receiving a second indication specifying that the user equipment is to use the second HARQ feedback granularity; receiving a second downlink transmission after receiving the second indication; generating a second HARQ feedback indicating whether the user equipment successfully received the second downlink transmission; and transmitting the second HARQ feedback using the second HARQ feedback granularity according to the second indication.

Aspect 6: The method of aspect 5, further comprising: maintaining a first HARQ feedback codebook for the first HARQ feedback granularity; and maintaining a second HARQ feedback codebook for the second HARQ feedback granularity, wherein the second HARQ feedback codebook is different from the first HARQ feedback codebook.

Aspect 7: The method of aspect 6,further comprising: receiving a first downlink assignment index (DAI) via a first physical downlink control channel (PDCCH) that schedules the first downlink transmission; and receiving a second DAI different from the first DAI via a second PDCCH that schedules the second downlink transmission.

Aspect 8: The method of aspect 7, wherein: transmitting the first HARQ feedback comprises transmitting the first HARQ feedback based on the first DAI; and transmitting the second HARQ feedback comprises transmitting the second HARQ feedback based on the second DAI.

Aspect 9: The method of any of aspects 1 through 8, wherein receiving the first indication comprises: receiving a medium access control-control element (MAC-CE) that includes the first indication.

Aspect 10: The method of aspect 9, further comprising: generating second HARQ feedback indicating that the user equipment successfully received the MAC-CE; transmitting the second HARQ feedback at a first time; and switching to use of the first HARQ feedback granularity for subsequent HARQ transmissions by the user equipment at a second time that follows the first time.

Aspect 11: The method of aspect 10, wherein the switching is from prior use of the second HARQ feedback granularity by the user equipment.

Aspect 12: The method of any of aspects 10 through 11, wherein the second time occurs within a defined period of time after the first time.

Aspect 13: The method of aspect 12, wherein the defined period of time is three milliseconds.

Aspect 14: The method of any of aspects 12 through 13, further comprising: abstaining from transmitting HARQ transmissions between the first time and the second time.

Aspect 15: The method of any of aspects 1 through 14, wherein receiving the first indication comprises: receiving a first downlink control information (DCI) that includes the first indication and schedules the first downlink transmission.

Aspect 16: The method of aspect 15, further comprising: receiving a second downlink transmission; generating a second HARQ feedback indicating whether the user equipment successfully received the second downlink transmission; generating a first HARQ codebook for the first HARQ feedback; generating a second HARQ codebook for the second HARQ feedback; determining that a first uplink resource for the first HARQ feedback and a second uplink resource for the second HARQ feedback at least partially overlap; and merging the first HARQ codebook and the second HARQ codebook into a merged codebook after determining that the first uplink resource for the first HARQ feedback and the second uplink resource for the second HARQ feedback at least partially overlap; wherein transmitting the first HARQ feedback comprises transmitting the merged codebook.

Aspect 17: The method of aspect 16, further comprising: determining that the first HARQ feedback is scheduled for an earlier transmission than the second HARQ feedback; wherein merging the first HARQ codebook and the second HARQ codebook comprises merging the second HARQ codebook into the first HARQ codebook as a result of determining that the first HARQ feedback is scheduled for the earlier transmission than the second HARQ feedback.

Aspect 18: The method of aspect 16, further comprising: determining that the first uplink resource has more orthogonal frequency division multiplexing (OFDM) symbols than the second uplink resource; wherein transmitting the merged codebook comprises transmitting the merged codebook via the first uplink resource as a result of determining that the first uplink resource has more OFDM symbols than the second uplink resource.

Aspect 19: The method of aspect 16, further comprising: determining that the first DCI for the first downlink transmission was received by the user equipment after a second DCI for the second downlink transmission; wherein transmitting the merged codebook comprises transmitting the merged codebook according to a HARQ timeline for the first downlink transmission as a result of determining that the first DCI for the first downlink transmission was received by the user equipment after the second DCI for the second downlink transmission.

Aspect 20: The method of any of aspects 1 through 19, wherein receiving the first indication comprises: receiving a first downlink control information (DCI) that includes the first indication.

Aspect 21: The method of aspect 20, further comprising: receiving a second DCI that schedules the first downlink transmission.

Aspect 23: A method for wireless communication at a base station, the method comprising: transmitting a hybrid automatic repeat request (HARQ) configuration specifying a first HARQ feedback granularity and a second HARQ feedback granularity; transmitting a first indication specifying that a user equipment is to use the first HARQ feedback granularity; transmitting a first downlink transmission after transmitting the first indication; and receiving a first HARQ feedback at the first HARQ feedback granularity, wherein the first HARQ feedback indicates whether the user equipment successfully received the first downlink transmission.

Aspect 24: The method of aspect 23, further comprising: transmitting a resource configuration specifying a plurality of first uplink resources for the first HARQ feedback granularity and a plurality of second uplink resources for the second HARQ feedback granularity; wherein receiving the first HARQ feedback comprises receiving the first HARQ feedback on a selected resource of the plurality of first uplink resources.

Aspect 25: The method of any of aspects 23 through 24, further comprising: transmitting a second indication specifying that the user equipment is to use the second HARQ feedback granularity; transmitting a second downlink transmission after transmitting the second indication; and receiving a second HARQ feedback at the second HARQ feedback granularity, the second HARQ feedback indicating whether the user equipment successfully received the second downlink transmission.

Aspect 26: The method of aspect 25, further comprising: transmitting a first downlink assignment index (DAI) via a first physical downlink control channel (PDCCH) that schedules the first downlink transmission; and transmitting a second DAI different from the first DAI via a second PDCCH that schedules the second downlink transmission.

Aspect 27: The method of any of aspects 23 through 26, further comprising: transmitting a medium access control-control element (MAC-CE) that includes the first indication.

Aspect 28: The method of aspect 27, further comprising: receiving second HARQ feedback indicating that the user equipment successfully received the MAC-CE; and abstaining from scheduling any downlink transmissions to the user equipment for a defined period of time that commences after receiving the second HARQ feedback.

Aspect 29: The method of aspect 28, further comprising: switching to use of the first HARQ feedback granularity for receiving subsequent HARQ transmissions from the user equipment after the defined period of time.

Aspect 30: A user equipment comprising: a transceiver configured to communicate with a radio access network, a memory, and a processor communicatively coupled to the transceiver and the memory, wherein the processor and the memory are configured to perform any one of aspects 1 through 21.

Aspect 31: An apparatus configured for wireless communication comprising at least one means for performing any one of aspects 1 through 21.

Aspect 32: A non-transitory computer-readable medium storing computer-executable code, comprising code for causing an apparatus to perform any one of aspects 1 through 21.

Aspect 33: A base station comprising: a transceiver, a memory, and a processor communicatively coupled to the transceiver and the memory, wherein the processor and the memory are configured to perform any one of aspects 23 through 29.

Aspect 34: An apparatus configured for wireless communication comprising at least one means for performing any one of aspects 23 through 29.

Aspect 35: A non-transitory computer-readable medium storing computer-executable code, comprising code for causing an apparatus to perform any one of aspects 23 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 9, 10, 11, and 14 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
   one or more memories storing processor-executable code; and
   one or more processors configured to execute the processor-executable code to cause the user equipment to:
   receive a radio resource control (RRC) message comprising a first hybrid automatic repeat request (HARQ) configuration and a second HARQ configuration, the first HARQ configuration specifying a first HARQ feedback granularity and the second HARQ configuration specifying a second HARQ feedback granularity;
   receive a first indication specifying that the user equipment is to use the first HARQ configuration specifying the first HARQ feedback granularity for a first HARQ process associated with a first physical downlink shared channel (PDSCH) transmission;
   receive the first PDSCH transmission after the receipt of the first indication;
   transmit a first HARQ feedback based on the first HARQ configuration specifying the first HARQ feedback granularity, the first HARQ feedback indicating whether the user equipment successfully received the first PDSCH transmission;
   receive a second indication specifying that the user equipment is to switch to the second HARQ configuration specifying the second HARQ feedback granularity for a second HARQ process associated with a second PDSCH transmission;
   receive the second PDSCH transmission after the receipt of the second indication; and
   transmit a second HARQ feedback based on the second HARQ configuration specifying the second HARQ feedback granularity, the second HARQ feedback indicating whether the user equipment successfully received the second PDSCH transmission.

2. The user equipment of claim 1, wherein:
   the first HARQ feedback granularity is a first sub-slot granularity; and
   the second HARQ feedback granularity is a second sub-slot granularity.

3. The user equipment of claim 1, wherein:
   the first HARQ feedback granularity is two orthogonal frequency division multiplexing (OFDM) symbols and the second HARQ feedback granularity is seven OFDM symbols; or
   the first HARQ feedback granularity is seven OFDM symbols and the second HARQ feedback granularity is two OFDM symbols.

4. The user equipment of claim 1, wherein the one or more processors are further configured to execute the processor-executable code to cause the user equipment to:
   receive a resource configuration specifying a plurality of first uplink resources for the first HARQ feedback granularity and a plurality of second uplink resources for the second HARQ feedback granularity; and
   transmit the first HARQ feedback on a selected resource of the plurality of first uplink resources.

5. The user equipment of claim 1, wherein the one or more processors are further configured to execute the processor-executable code to cause the user equipment to:
   maintain a first HARQ feedback codebook for the first HARQ feedback granularity; and
   maintain a second HARQ feedback codebook for the second HARQ feedback granularity, wherein the second HARQ feedback codebook is different from the first HARQ feedback codebook.

6. The user equipment of claim 1, wherein the one or more processors are further configured to execute the processor-executable code to cause the user equipment to:
   receive a first downlink assignment index (DAI) via a first physical downlink control channel (PDCCH) that schedules the first PDSCH transmission; and
   receive a second DAI different from the first DAI via a second PDCCH that schedules the second PDSCH transmission.

7. The user equipment of claim 6, wherein the one or more processors are further configured to execute the processor-executable code to cause the user equipment to:
   transmit the first HARQ feedback based on the first DAI; and
   transmit the second HARQ feedback based on the second DAI.

8. The user equipment of claim 1, wherein the one or more processors are further configured to execute the processor-executable code to cause the user equipment to:
   receive a medium access control-control element (MAC-CE) that includes the first indication.

9. The user equipment of claim 8, wherein the one or more processors are further configured to execute the processor-executable code to cause the user equipment to:
generate the first HARQ feedback indicating that the user equipment successfully received the MAC-CE;
transmit the first HARQ feedback at a first time; and
switch to use of the first HARQ configuration specifying the first HARQ feedback granularity for subsequent HARQ transmissions by the user equipment at a second time that falls within a transition period following the first time.

10. The user equipment of claim 9, wherein the switch is from prior use of the second HARQ configuration specifying the second HARQ feedback granularity by the user equipment.

11. The user equipment of claim 9, wherein the second time occurs within a defined period of time after the first time.

12. The user equipment of claim 11, wherein the defined period of time is three milliseconds.

13. The user equipment of claim 11, wherein the one or more processors are further configured to execute the processor-executable code to cause the user equipment to:
abstain from transmitting HARQ transmissions between the first time and the second time.

14. The user equipment of claim 1, wherein the one or more processors are further configured to execute the processor-executable code to cause the user equipment to:
receive a first downlink control information (DCI) that includes the first indication and schedules the first PDSCH transmission.

15. The user equipment of claim 14, wherein the one or more processors are further configured to execute the processor-executable code to cause the user equipment to:
generate a first HARQ codebook for the first HARQ feedback;
generate a second HARQ codebook for the second HARQ feedback;
determine that a first uplink resource for the first HARQ feedback and a second uplink resource for the second HARQ feedback at least partially overlap;
merge the first HARQ codebook and the second HARQ codebook into a merged codebook after a determination that the first uplink resource for the first HARQ feedback and the second uplink resource for the second HARQ feedback at least partially overlap; and
transmit the merged codebook.

16. The user equipment of claim 15, wherein the one or more processors are further configured to execute the processor-executable code to cause the user equipment to:
determine that the first HARQ feedback is scheduled for an earlier transmission than the second HARQ feedback; and
merge the second HARQ codebook into the first HARQ codebook as a result of a determination that the first HARQ feedback is scheduled for the earlier transmission than the second HARQ feedback.

17. The user equipment of claim 15, wherein the one or more processors are further configured to execute the processor-executable code to cause the user equipment to:
determine that the first uplink resource has more orthogonal frequency division multiplexing (OFDM) symbols than the second uplink resource; and
transmit the merged codebook via the first uplink resource as a result of determining that the first uplink resource has more OFDM symbols than the second uplink resource.

18. The user equipment of claim 15, wherein the one or more processors are further configured to execute the processor-executable code to cause the user equipment to:
determine that the first DCI that schedules the first PDSCH transmission was received by the user equipment after a second DCI for the second PDSCH transmission;
transmit the merged codebook according to a HARQ timeline for the first downlink transmission as a result of a determination that the first DCI that schedules the first PDSCH transmission was received by the user equipment after the second DCI for the second PDSCH transmission.

19. The user equipment of claim 1, wherein the one or more processors are further configured to execute the processor-executable code to cause the user equipment to:
receive a first downlink control information (DCI) that includes the first indication.

20. The user equipment of claim 19, wherein the one or more processors are further configured to execute the processor-executable code to cause the user equipment to:
receive a second DCI that schedules the first PDSCH transmission.

21. A method for wireless communication at a user equipment, the method comprising:
receiving a radio resource control (RRC) message comprising a first hybrid automatic repeat request (HARQ) configuration and a second HARQ configuration, the first HARQ configuration specifying a first HARQ feedback granularity and the second HARQ configuration specifying a second HARQ feedback granularity;
receiving a first indication specifying that the user equipment is to use the first HARQ configuration specifying the first HARQ feedback granularity for a first HARQ process associated with a first physical downlink shared channel (PDSCH) transmission;
receiving the first PDSCH transmission after receiving the first indication;
transmitting a first HARQ feedback based on the first HARQ configuration specifying the first HARQ feedback granularity, the first HARQ feedback indicating whether the user equipment successfully received the first PDSCH transmission;
receiving a second indication specifying that the user equipment is to switch to the second HARQ configuration specifying the second HARQ feedback granularity for a second HARQ process associated with a second PDSCH transmission;
receiving the second PDSCH transmission after receiving the second indication; and
transmitting a second HARQ feedback based on the second HARQ configuration specifying the second HARQ feedback granularity, the second HARQ feedback indicating whether the user equipment successfully received the second PDSCH transmission.

22. A network entity, comprising:
one or more memories storing processor-executable code; and
one or more processors configured to execute the processor-executable code to cause the network entity to:
transmit a radio resource control (RRC) message comprising a first hybrid automatic repeat request (HARQ) configuration and a second HARQ configuration, the first HARQ configuration specifying a first HARQ feedback granularity and the second HARQ configuration specifying a second HARQ feedback granularity;

transmit a first indication specifying that a user equipment is to use the first HARQ configuration specifying the first HARQ feedback granularity for a first HARQ process associated with a first physical downlink shared channel (PDSCH) transmission;

transmit the first PDSCH transmission after the transmission of the first indication;

receive a first HARQ feedback based on the first HARQ configuration specifying the first HARQ feedback granularity, the first HARQ feedback indicating whether the user equipment successfully received the first PDSCH transmission;

transmit a second indication specifying that the user equipment is to switch to the second HARQ configuration specifying the second HARQ feedback granularity for a second HARQ process associated with a second PDSCH transmission;

transmit the second PDSCH transmission after the transmission of the second indication; and receive a second HARQ feedback based on the second HARQ configuration specifying the second HARQ feedback granularity, the second HARQ feedback indicating whether the user equipment successfully received the second PDSCH transmission.

23. The network entity of claim 22, wherein the one or more processors are further configured to execute the processor-executable code to cause the network entity to:

transmit a resource configuration specifying a plurality of first uplink resources for the first HARQ feedback granularity and a plurality of second uplink resources for the second HARQ feedback granularity; and receive the first HARQ feedback on a selected resource of the plurality of first uplink resources.

24. The network entity of claim 22, wherein the one or more processors are further configured to execute the processor-executable code to cause the network entity to:

transmit a first downlink assignment index (DAI) via a first physical downlink control channel (PDCCH) that schedules the first PDSCH transmission; and transmit a second DAI different from the first DAI via a second PDCCH that schedules the second PDSCH transmission.

25. The network entity of claim 22, wherein the one or more processors are further configured to execute the processor-executable code to cause the network entity to:

transmit a medium access control-control element (MAC-CE) that includes the first indication.

26. The network entity of claim 25, wherein the one or more processors are further configured to execute the processor-executable code to cause the network entity to:

receive the first HARQ feedback indicating that the user equipment successfully received the MAC-CE; and abstain from scheduling any downlink transmissions to the user equipment for a defined period of time that commences after the receipt of the first HARQ feedback.

27. The network entity of claim 26, wherein the one or more processors are further configured to execute the processor-executable code to cause the network entity to:

switch to use of the first HARQ configuration specifying the first HARQ feedback granularity for receipt of subsequent HARQ transmissions from the user equipment after the defined period of time.

28. A method for wireless communication at a network entity, the method comprising:

transmitting a radio resource control (RRC) message comprising a first hybrid automatic repeat request (HARQ) configuration and a second HARQ configuration, the first HARQ configuration specifying a first HARQ feedback granularity and the second HARQ configuration specifying a second HARQ feedback granularity;

transmitting a first indication specifying that a user equipment is to use the first HARQ configuration specifying the first HARQ feedback granularity for a first HARQ process associated with a first physical downlink shared channel (PDSCH) transmission;

transmitting the first PDSCH transmission after transmitting the first indication;

receiving a first HARQ feedback based on the first HARQ configuration specifying the first HARQ feedback granularity, the first HARQ feedback indicating whether the user equipment successfully received the first PDSCH transmission;

transmitting a second indication specifying that the user equipment is to switch to the second HARQ configuration specifying the second HARQ feedback granularity for a second HARQ process associated with a second PDSCH transmission;

transmitting the second PDSCH transmission after transmitting the second indication; and receiving a second HARQ feedback based on the second HARQ configuration specifying the second HARQ feedback granularity, the second HARQ feedback indicating whether the user equipment successfully received the second PDSCH transmission.

* * * * *